United States Patent
Fukushima et al.

(10) Patent No.: US 7,606,227 B2
(45) Date of Patent: Oct. 20, 2009

(54) METHOD, APPARATUS AND SYSTEM FOR DISTRIBUTING MULTICAST DATA

(75) Inventors: Hidehiro Fukushima, Fujisawa (JP); Shigeki Morimoto, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 969 days.

(21) Appl. No.: 10/790,056

(22) Filed: Mar. 2, 2004

(65) Prior Publication Data
US 2004/0264463 A1 Dec. 30, 2004

(30) Foreign Application Priority Data
Jun. 26, 2003 (JP) ............................. 2003-181993

(51) Int. Cl.
*H04L 12/28* (2006.01)
*H04L 12/56* (2006.01)
*H04J 3/26* (2006.01)
*H04W 4/00* (2009.01)

(52) U.S. Cl. ................. 370/390; 370/351; 370/432; 455/435.1

(58) Field of Classification Search ........... 370/352, 370/392, 382, 390, 432; 455/435.1, 3.01; 725/62, 63, 73, 74, 105
See application file for complete search history.

(56) References Cited

U.S. PATENT DOCUMENTS

| | | | | |
|---|---|---|---|---|
| 6,836,481 B1 * | 12/2004 | Hotta | ................. | 370/392 |
| 7,161,934 B2 * | 1/2007 | Buchsbaum et al. | ........ | 370/382 |
| 7,221,674 B2 * | 5/2007 | Lim | ................. | 370/390 |
| 2002/0136201 A1 * | 9/2002 | Buchsbaum et al. | ........ | 370/352 |

FOREIGN PATENT DOCUMENTS

JP 2002-77254 3/2002

OTHER PUBLICATIONS

Network Working Group Request for Comments: 2236, "3. Protocol Description", Nov. 1997.
Network Working Group Request for Comments: 2710, "4. Protocol Description", Nov. 1997.
Network Working Group Request for Comments: 2362, "2. PIM-SM Protocol Overview", Nov. 1997.

* cited by examiner

*Primary Examiner*—Thjuan K Addy
(74) *Attorney, Agent, or Firm*—Mattingly & Malur, P.C.

(57) ABSTRACT

Packets of mobile communication protocol which a mobile terminal sends and receives are monitored and when it is detected that a mobile terminal to which a multicast data packet is transferred moved to another network, a multicast gateway apparatus connected to the moving destination network makes a group attend request and transfers the multicast data packet to the moved mobile terminal.

3 Claims, 20 Drawing Sheets

| ID | ADDRESS | PROTOCOL | PORT | URL | GROUP | ADDITIVE INFORMATION | STATE |
|----|---------|----------|------|------|---------|---------------------|-------|
| 1 | S1 | TCP | 80 | - | G1 | - | 0 |
| 2 | S2 | TCP | 80 | url1 | G21,G22 | - | 0 |
| 3 | S3 | TCP | - | url2 | G3 | - | 0 |
|  |  |  |  |  |  |  |  |

FIG. 5

| TERMINAL ADDRESS | SERVICE | ENCAPSULATION | ACCESS TIME |
|---|---|---|---|
| H1 | ID=1 | C1 | |
| H2 | ID=2 | – | |
| | | | |

FIG. 6

| GROUP | SENDING TERMINAL |
|---|---|
| G1 | S1 |
| G21 | S2 |
| G22 | S3 |

| HOME ADDRESS | CARE-OF ADDRESS | MOBILE INFORMATION | GATEWAY |
|---|---|---|---|
| H1 | C1 | | |
| H2 | C2 | | |
| | | | |

METHOD, APPARATUS AND SYSTEM FOR DISTRIBUTING MULTICAST DATA

CROSS-REFERENCE TO RELATED APPLICATIONS

The present invention is related to U.S. patent application Ser. No. 10/364,450 filed Feb. 10, 2003 entitled "APPARATUS AND SYSTEM FOR MULTICAST COMMUNICATION".

BACKGROUND OF THE INVENTION

The present invention relates to a communication method for providing a distribution service by multicast, a communication system, and an apparatus for relaying data packet distributed by multicast.

It has been increasing the building of a wireless network which connects terminals provided with a wireless communication function and mobile telephones which are capable of data communication have been spreading widely. Mobile telephones have become able to receive music and dynamic image, and the chances to distribute information to information apparatuses and terminals which are capable of mobile communication will increase in the future. The multicast communication is a communication method which broadcasts data packet to a large number of terminals, and generally can distribute information efficiently compared to the unicast communication performed between the terminals. The multicast communication is suited to distribute in particular information which occurs in real time, for example, live broadcast, sensing information in various environments and monitoring information of status.

In the multicast communication, a sending terminal sends a data packet addressed to a multicast group. On the other hand, a receiving terminal can receive the data packet by becoming a group member of a desired multicast group, and can stop receiving data packet by withdrawing from the group member.

The receiving terminal uses a group management protocol and sends a control packet which makes a group attend request to become a group member or a group withdrawal request to withdraw from a group member to a router connected to the same network. The receiving terminal is able to request to attend and withdraw from the multicast group member at any time and freely. As a group management protocol IGMP (Internet Group Management Protocol) is defined by standard recommendation document RFC (Request For Comments) 2236 created by IETF (Internet Engineering Task Force), and by RFC2710 MLD (Multicast Listener Discovery) is defined.

A router periodically sends an attend group inquiry packet by the group management protocol to check whether a group member exists or not, and the receiving terminal being a group member responds to the inquiry by a group attend request. The router decides whether a group member exists or not by the presence of the response to the inquiry packet, and relays data packet only to networks in which group members exist. The router confirms the existence of group member, and when it decides that relay of data packet is necessary, posts a distribution request to other routers using a multicast path control protocol. Alternatively, when group member does not exist and it decides that relay of data packet is not necessary, it posts a distribution stop request. Each router retains relay information for multicast data packet, and updates the relay information according to the contents of the posted multicast path control protocol, and further, sends a distribution request or distribution stop request toward a sending terminal according to the update contents. The distribution request or distribution stop request is processed by a multicast router existing on the path from the sending terminal to each receiving terminal, and the best suited multicast distribution path is established from the sending terminal to each receiving terminal. As a typical multicast path control protocol, PIM-SM (Protocol Independent Multicast Sparse Mode) is defined by RFC2362.

To provide a multicast distribution service it is necessary that the above-mentioned multicast path control protocol would operate on all of the routers which configure the network. Also, on the side of the terminal which receives data packet distributed by multicast the group management protocol must operate. This means that it is needed to add functions to all the existing apparatuses and it would be highly costly.

On the other hand, as a communication technique for a mobile terminal which communicates while moving such as a mobile telephone mobile IP is defined by RFC2002. The mobile terminal uses an address called a home address on the original connection network (hereinafter it is called a home network). A home agent (hereinafter it is called HA) which is located in each network manages the home address of the mobile terminal. When the mobile terminal moves to other network, it is given a care-of address by a foreign agent (hereinafter it is called FA) which is located in the moving destination network (hereinafter it is called a foreign network), which it can use only while it is connected to the foreign network. The mobile terminal first sends a registration request message including the given care-of address to FA to register the care-of address in HA, and FA transfers it to HA. On receiving the registration request message, HA retains the care-of address and sends a registration response message which indicates whether the registration request has been accepted or rejected to FA or the mobile terminal. Hereafter, on receiving a data packet addressed to the home address of the mobile terminal, HA encapsulates and transfers the data packet to the care-of address. On receiving the encapsulated data packet, FA decapsulates the data packet and transfers it to the mobile terminal. Although in the mobile IP a data packet addressed to the mobile terminal passes via HA, a packet which the mobile terminal sends reaches directly to the corresponding terminal. HA and FA send an agent advertisement message to decide whether the mobile terminal is connected to the home network or to the foreign network. When FA does not exist in the foreign network, the mobile terminal can post the registration request message directly to HA and HA can receive directly the encapsulated data packet.

In the mobile IP two methods are defined for the mobile terminal to receive multicast data in the foreign network. One is a method to send a group attend request to HA in which when HA receives multicast data addressed to the group which the mobile terminal requested, it encapsulates and sends the packet to the care-of address. Another is a method to issue a group attend request to a multicast router located in the foreign network. When performing multicast by this mobile IP, the mobile terminal and HA or the router located in the foreign network need to be provided with a multicast function.

SUMMARY OF THE INVENTION

As an example of technique for a terminal which does not support a multicast function to receive data packet distributed by multicast is disclosed in U.S. patent application Ser. No. 10/364,450.

As a network architecture for a terminal even without a multicast data receiving function to receive data multicast distributed, an architecture described below is conceivable. That is, to locate a gateway on the contact of the home network of the mobile terminal and the foreign network, and to provide this gateway with a conversion function of multicast data to unicast data. This gateway (hereinafter it is called a multicast communication apparatus) has registered address information of distribution server, multicast group address utilized for multicast distribution, and so on.

The multicast communication apparatus monitors packet sent between the terminal and the multicast distribution server, and on detecting an access start request packet to the multicast distribution server stores a source address of the access request packet and issues a group attend request to the nearest multicast router. Here, the multicast router is a router which relays packet sent from the multicast distribution server by multicast distribution.

On receiving the group attend request from the multicast communication apparatus, the multicast router performs a multicast path control process and transfers the multicast packet sent from the distribution server to the multicast communication apparatus. The multicast communication apparatus converts the multicast data received from the multicast router to unicast data and transfers it to the registered address of the terminal.

Even when the terminal is a mobile terminal and the terminal moved to the foreign network, it is more or less possible to send multicast data to the terminal by sending multicast data converted to unicast data to HA, since if HA knows the care-of address of the terminal it transfers the data to the care-of address.

However, in case where the mobile terminal moved to the foreign network, when multicast data packet is transferred it passes via HA located in the home network of the mobile terminal. Therefore, extra traffic occurs in the home network of the mobile terminal and consumes the broadband of the network in vain. Also, if fault occurs in HA by any chance, the terminal becomes unable to receive the distribution service of multicast data.

An object of the present invention is to provide an apparatus and a system in which a mobile terminal which does not support a multicast function can receive data distributed by multicast without adding any special function.

In order to solve the above-mentioned problems, a gateway apparatus (a multicast communication apparatus) with the above-mentioned multicast data—unicast data conversion function is provided in the home network and the foreign network, and the multicast communication apparatus located in the home network transfers information necessary to transfer multicast data to the terminal to the moving destination of the terminal. Transfer of the information is performed, for example, with the registration of the terminal and the like as a trigger. Below, for the purpose of simplification, a multicast communication apparatus which performs unicast conversion of multicast data while the terminal is connected to the home network is called a home gateway, and a multicast communication apparatus which performs unicast conversion of multicast data when the terminal moves to the foreign network is called a moving destination gateway.

Further, the location in which the home gateway or moving destination gateway is located does not need to be limited within the home network or within the foreign network, and it does not matter where it is located as long as it is located on the sending path of multicast data. For example, if it is a home gateway, it only needs to be located somewhere on the communication path connecting the distribution server of multicast data and HA. Also, the moving destination gateway only needs to be located somewhere on the communication path connecting the distribution server and FA. However, the registration message of the terminal needs to reach each multicast gateway.

By the above-mentioned configuration, it becomes possible to distribute multicast data to the terminal without passing via HA. Also, on the side of the terminal, it becomes possible to receive the same service as it received in the home network in the moving destination foreign network.

Other objects, features and advantages of the invention will become apparent from the following description of the embodiments of the invention taken in conjunction with the accompanying drawings.

BRIEF DESCRIPTION OF THE DRAWINGS

FIG. 5 shows an example of an access terminal management table.

FIG. 6 shows an example of a group management table.

DETAILED DESCRIPTION OF THE EMBODIMENTS

Embodiment 1

Figure 1:
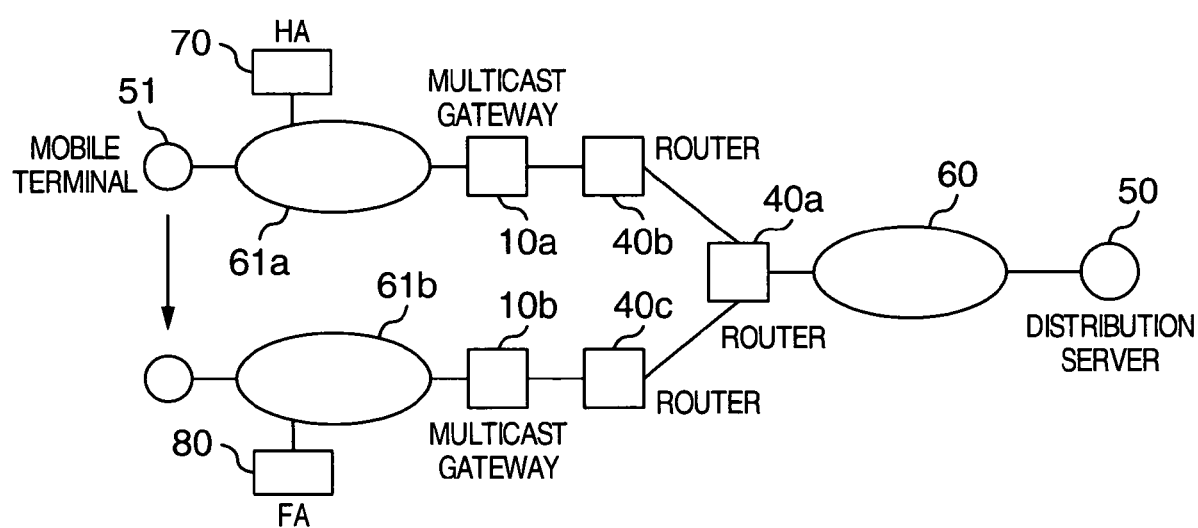
FIG. 1 is a configuration diagram of a network system to which a multicast gateway apparatus according to the first embodiment is applied.

It will be described below in detail about embodiments of the present invention. FIG. 1 is a diagram showing a network system configuration using a multicast gateway apparatus 10 according to the first embodiment.

A multicast gateway apparatus 10*a* is connected to a multicast router 40*b*, and a multicast gateway apparatus 10*b* is connected to a multicast router 40*c*. Also, multicast gateway apparatuses 10*a*, 10*b* are connected to networks 61*a*, 61*b* respectively. To a network 60 a distribution server 50 (with address S) is connected, and it is assumed that information of distribution server 50 is registered in multicast gateway apparatuses 10*a*, 10*b*. To network 61*a* a mobile terminal 51 (with address H1) and a HA 70 are connected, and to network 61*b* a FA 80 is connected. Distribution server 50 sends data packet by multicast to a group address G.

Multicast gateway apparatuses 10*a*, 10*b* are located on the communication path between mobile terminal 51 and distribution server 50, and monitor the communication between mobile terminal 51 and distribution server 50. For multicast gateway apparatus 10*a* it has been registered previously information of distribution server 50 and service information which distribution server 50 provides. As information of distribution server, an address of server, URL to which it accesses to receive service, etc. are included. Also, as service information a multicast group address to use for distribution of data, etc. have been set. These pieces of information may be set in multicast gateway apparatus 10*a* by a network administrator or may be posted from distribution server 50.

When mobile terminal 51 outputs an access request to distribution server 50, multicast gateway apparatus 10*a* detects the access request and registers the address H1 of mobile terminal 51 and service information which mobile terminal 51 requests in an access terminal management table which is retained within multicast gateway apparatus 10*a*. When mobile terminal 51 which accesses distribution server 50 is the first one, multicast gateway apparatus 10*a* issues an attend request to group G to the nearest multicast router 40*b* using the group management protocol. On receiving the group attend request, multicast router 40*b* performs multicast path control, and relays data packet which distribution server 50 distributed to group G to multicast gateway apparatus 10*a*.

Each multicast gateway apparatus compares address information of mobile terminal included in the registration request and registration response message with address information of receiving terminal which is accessing distribution server, and if there is any address information which matches it decides that the mobile terminal to which it transfers data packet has moved to a foreign network. Multicast gateway apparatus on the home network posts service information which the mobile terminal was receiving on the home network to multicast gateway apparatus on the foreign network. On receiving the notice, multicast gateway apparatus on the foreign network issues a group attend request to multicast group related to the service information to the nearest multicast router. Multicast router relays multicast data packet to multicast gateway apparatus by the group attend request. On receiving the multicast data packet, multicast gateway apparatus on the foreign network transfers the packet addressed to care-of address.

On receiving a data packet addressed to group G, multicast gateway apparatus 10*a* retrieves whether there is a terminal to receive the data packet from the above mentioned access terminal management table, and as mobile terminal 51 is registered, it sets the destination of the received data packet to address H1 and transfers it to mobile terminal 51.

When mobile terminal moved to the foreign network, it sends a registration request message of mobile IP to HA. On receiving the registration request message, HA performs registration process of the mobile terminal and sends a registration response message to the mobile terminal or FA. Also, it is arranged that registration request message and registration response message would pass via each multicast gateway apparatus. This will be described in detail below.

When mobile terminal 51 moves to network 61*b*, it sends a registration request message of mobile IP to FA 80 of network 61*b*, and FA 80 transfers the registration request message to HA 70. On receiving the registration request message, multicast gateway apparatus 10*b* registers home address and care-of address information of mobile terminal 51 included in the registration request message in a mobile terminal management table which is retained in multicast gateway apparatus 10*b*. Further, multicast gateway apparatus 10*b* newly adds its own address information to the registration request message and transfers it to HA 70. Multicast gateway apparatus 10*a* registers home address and care-of address information of mobile terminal 51 included in the received registration request message and address information of multicast gateway apparatus 10*b* in a mobile terminal management table which is retained within multicast gateway apparatus 10*a*. Further, multicast gateway apparatus 10*a* removes address information of multicast gateway apparatus 10*b* from the registration request message and transfers it to HA 70. HA 70 receives the registration request message and sends a registration response message to FA 80 of network 61*b* after performing registration process of mobile terminal 51. Multicast gateway apparatus 10*a* adds its own address information to the registration response message and transfers it to FA 80. Further, if home address information of mobile terminal 51 is registered in the access terminal management table, multicast gateway apparatus 10*a* sends an access state registration packet including address information of mobile terminal 51 and receiving service information to multicast gateway apparatus 10*b*.

Multicast gateway apparatus always monitors the access state of each terminal, and when it detects some change, it decides that the transfer of data packet is unnecessary and issues a withdrawal request from the group. As a change of the access state, there are cases when receiving terminal terminates access, when receiving terminal accesses another service, when data from multicast gateway apparatus to receiving terminal could not be sent because of fault and the like, etc. As an example of the case where it is decided that receiving terminal terminated access, the example of monitoring TCP connection will be explained. When accessing by TCP, receiving terminal issues a SYN packet of TCP and requests establishment of TCP connection. When terminating TCP connection already established it sends a FIN packet of TCP.

In multicast gateway apparatus, when it detects that a receiving terminal which currently accesses issued a FIN packet, it deletes information of the receiving terminal from the access terminal management table as the receiving terminal terminated access to distribution server. When it decides that data packet of accessing service is unnecessary by this, it issues a withdrawal request from multicast group related to the service to the nearest multicast router to stop distributing the data packet. On receiving the group withdrawal request, multicast router performs multicast path control and stops relaying multicast data packet to multicast gateway apparatus.

Alternatively, if the contents of registration request and registration response message are request and response to delete address information previously registered, information of the receiving terminal will be deleted from the access terminal management table. When multicast gateway apparatus decides that data packet of accessing service is unnecessary by this, it issues a withdrawal request from multicast group related to the currently receiving service to the nearest multicast router. Information of period in which this registration information is effective is included in the registration request and registration response message. When this effective period expires, information of the receiving terminal may be deleted from the access terminal management table.

It will be described below in detail according to FIG. 1. If home address information and care-of address information of mobile terminal 51 included in the received registration response message are registered in the mobile terminal management table, multicast gateway apparatus 10b registers encapsulation information and address information of multicast gateway apparatus 10a included in the registration response message in the mobile terminal management table, deletes address information of multicast gateway apparatus 10a from the registration response message, and transfers the registration response message to FA 80.

On receiving an access state registration packet from multicast gateway apparatus 10a, multicast gateway apparatus 10b issues an attend request to multicast group G related to service information included in the packet to multicast router 40c. Also, it registers home address information and care-of address information of mobile terminal 51, and encapsulation method, etc. in the access terminal management table, and sends an access state response packet indicating that access state has been registered to multicast gateway apparatus 10a. In this access state response packet address information of mobile terminal 51 and receiving service information are included. Multicast router 40c receives the group attend request and relays multicast data to multicast gateway apparatus 10b. On receiving multicast data, multicast gateway apparatus 10b encapsulates the data addressed to care-of address and transfers it. On receiving the access state response packet, multicast gateway apparatus 10a deletes information of mobile terminal 51 from the access terminal management table. At this point, if it is found that no mobile terminal accesses distribution server 50 at multicast gateway apparatus 10a, it issues a withdrawal request from group G to multicast router 40b. In response to this multicast router 40b relays data packet addressed to group G only to multicast gateway apparatus 10b.

Figure 2:
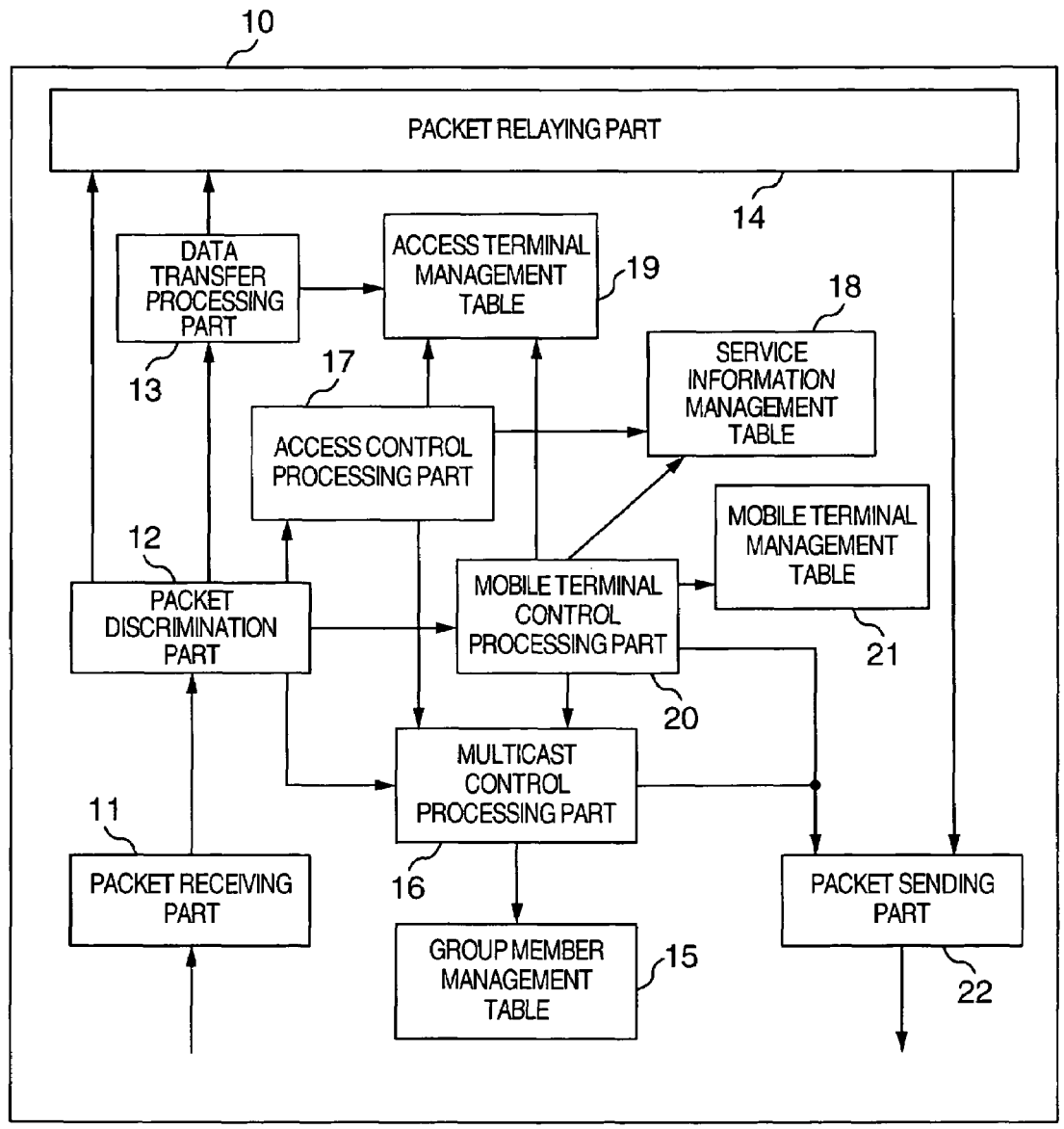
FIG. 2 is a block configuration diagram of the multicast gateway apparatus according to the first embodiment.

FIG. 2 shows a block diagram of multicast gateway apparatus 10 according to the first embodiment of the present invention.

Multicast gateway apparatus 10 receives data packet multicast distributed, access request packet from mobile terminal to distribution server, control packet of mobile IP, information packet of access state, and control packet related to multicast control process from the nearest multicast router at receiving part 11. When distribution server posts service information to multicast gateway apparatus 10, a packet including the service information is also received at receiving part 11. Packet discrimination part 12 discriminates which of the above-mentioned packets the received packet is. When it discriminates that it received an access request packet, the process is transferred to access control processing part 17. Access control processing part 17 extracts access information from the received packet and checks if there is information which matches service information retained in service information management table 18. If there is service information which matches, access control processing part 17 registers information of terminal which issued the access request in access terminal management table 19. Further, access control processing part 17 posts multicast group information which is registered in the service information and address information of distribution server to multicast control processing part 16. Multicast control processing part 16 registers group information and distribution server address information which access control processing part 17 posts in group management table 15, and sends a group attend request to the nearest multicast router using the group management protocol. When it is discriminated that it received a packet which posts service information at packet discrimination part 12 the process is also transferred to access control processing part 17. Access control processing part 17 extracts service information from the packet and registers it in service information management table 18.

When it is discriminated that it received a data packet, the process is transferred to data transfer processing part 13. Data transfer processing part 13 retrieves access terminal management table 19, obtains information of terminal to which the data packet is to be transferred, sets address information of each terminal to destination address information of the data packet, and delivers it to packet relaying part 14. If information indicating encapsulation is registered in access terminal management table 19, it sets address information of terminal, encapsulates the data packet addressed to care-of address and delivers it to packet relaying part 14.

When it is discriminated that it received a packet of mobile IP and an information packet of access state, the process is transferred to mobile terminal processing part 20. In mobile terminal processing part 20, if received packet is a registration request message of mobile IP, it registers mobile terminal address information and the like included in the registration request message in mobile terminal management table 21. Here, mobile terminal address information means home address or care-of address defined by mobile IP. If there is not information of multicast gateway in the received registration request message, it adds its own address information to the registration request message and transfers it to HA. If there is information of multicast gateway apparatus other than itself, it registers information of multicast gateway apparatus in mobile terminal management table 21, deletes information of the multicast gateway apparatus from the registration request message and transfers it to HA.

When received packet is a registration response message of mobile IP, if address information of multicast gateway apparatus is not included in the registration response message, it adds its own address information to it and transfers it to FA. Also, if address information of mobile terminal included in the registration response message is registered in access terminal management table 19, it sends an access state registration packet including address information of the mobile terminal and receiving service information to multicast gateway apparatus registered in mobile terminal management table 21. When address information of multicast gateway apparatus other than itself is included in the received registration response message, it registers the address information in mobile terminal management table 21, and deletes information of multicast gateway from the registration response message and transfers it to FA.

Information packet of access state is a packet which is sent and received between multicast gateway apparatuses, and there are registration packet and response packet. When receiving an access state registration packet, it retrieves service information included in the registration packet from service information management table 18, and posts related multicast group information and information of distribution server to multicast control processing part 16. Also, it registers mobile terminal information included in the registration packet in access terminal management table 19.

On receiving an access state response packet, it posts multicast group information related to service information included in the response packet and information of distribution server to multicast path control processing part 16, and deletes the mobile terminal information from access management table 19.

Packet sending part 22 sends data packet which packet relaying processing part 14 relays, mobile IP control packet, group management protocol packet which multicast control processing part 16 issues and information packet of access state which mobile terminal processing part 20 issues.

Figures 3, 4:
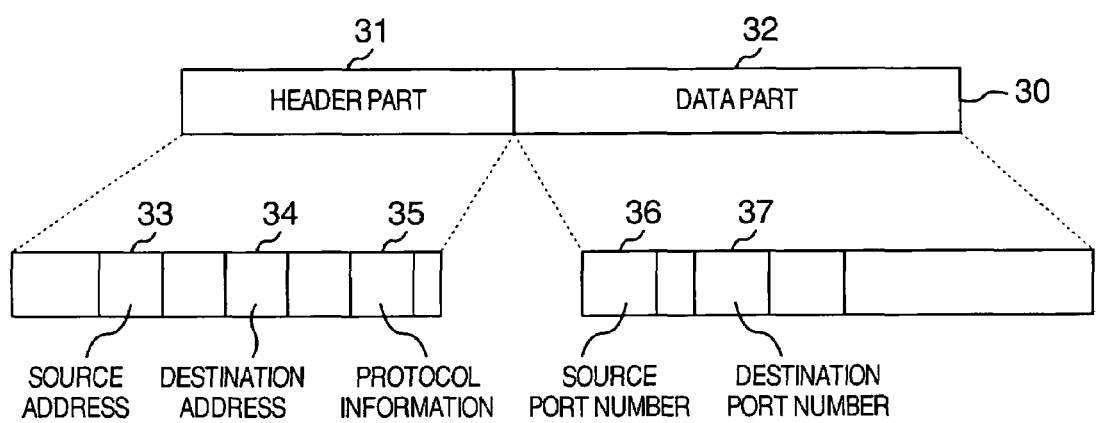
FIG. 3 is an example of a format of a multicast data packet which the multicast gateway apparatus handles.
FIG. 4 shows an example of a multicast service information table.

FIG. 3 shows a format of packet 30 which multicast gateway apparatus 10 processes. Packet 30 consists of header part 31 and data part 32. Header part 31 includes source address 33 of packet 30, destination address 34, and protocol information 35. In case of access request packet to distribution server which a terminal issues, each terminal sets address of distribution server to destination address 34. In case of data packet which distribution server distributes by multicast, distribution server sets multicast group address to destination address 34. In case when multicast gateway apparatus 10 transfers data packet multicast distributed to each terminal, multicast gateway apparatus 10 sets address of each terminal to destination address 34. Data part 32 includes information of layer from layer 4 to layer 7 of OSI reference model. As information of layer 4 it includes port number 36 which communication application uses. Information such as URL of distribution server which terminal accesses is included in data part 32. Encapsulated packet is a packet in which packet 30 which consists of header part 31 and data part 32 is considered data and further new header part 31 is added. To protocol number of this newly added header part 31 a protocol number indicating that it is encapsulated is set. When HA transfers data packet to mobile terminal which moved to a foreign network, it sets care-of address to destination address 34 of newly added header part 31.

FIG. 4 shows service information management table 18. Service information to be registered in service information management table 18 includes access information to distribution server which provides multicast distribution service and information of data packet which distribution server distributes by multicast. Access information includes distribution server address and protocol when accessing distribution server, port information, URL information indicating access destination, etc. Information of data packet to be multicast distributed includes multicast group address and additive information. As additive information it is included, for example, providing time of service, etc. When there is an access request out of service providing time, sending of extra control packet can be reduced by arranging not to issue a group attend request. Service information management table 18 includes information indicating a current receiving state of service. For example, multicast gateway apparatus 10 always monitors the access state from terminals and processes according to the number of receiving terminals. Access control processing part 17 sets the number of terminals which are receiving the service in service information management table 18, and conveys a request to multicast control processing part 16 according to a change of this terminal number. When the terminal number became 1 from 0, it posts a data packet receive request and when the terminal number became 0 from 1 it posts that receiving of data packet is terminated. In other cases it does not post anything.

For access information which is registered in service information management table 18 only distribution server address is required and it is not necessary to set all of protocol, port number and URL information. For example, it may be set only distribution server address, or it may be set in any combination, for example, it may be set only distribution server address, protocol and port number. Multicast gateway apparatus 10 compares the contents described in header part 31 and data part 32 of the received packet with the contents registered in service information management table 18. The comparison of service information is done only with the items registered in service information management table 18, and if there is a service which matches all of the items registered it issues a group attend request for multicast group corresponding to the service information. In group address it can be registered one or more group addresses which are used in each service. Multicast gateway apparatus 10 issues group attend requests for each of a plurality of group addresses registered in service which had access request. In the example showed in FIG. 3, when multicast gateway apparatus 10 detects that a terminal accessed a distribution server with address S1 using TCP as a protocol and with a packet with port number 80, regardless of URL which it tried to access, multicast gateway apparatus 10 issues an attend request for group G1. When multicast gateway apparatus 10 detected that a terminal accessed a distribution server with address S2 using TCP as a protocol and with a packet with port number 80 and URL of the access destination set to url1, multicast gateway apparatus 10 issues group attend requests for group G21 and group G22.

Distribution server generates a packet including in data part 32 of data packet 30 distribution server address, protocol, port number, URL, multicast group address, etc. as service information, and posts it to multicast gateway apparatus 10. Distribution server either sends service information to multicast gateway apparatus 10 or distributes it by multicast using specific multicast group address. Posting method can be set by the network administrator. In case where multicast gateway apparatus 10 distributes service information by multicast, it can receive service information by attending the multicast group. Service information may be directly set by the network administrator from a management terminal or the like without posting it from distribution server.

FIG. 5 shows access terminal management table 19. To access terminal management table 19 address of receiving terminal which requested access to distribution server, service information which is requested, encapsulation information and time information of when an access request is detected are set. Keeping the time information makes it possible to use it for calculating time during which a terminal received the service to charge each terminal. As request service information, it is set, for example, index information to each service which service information management table 18 retains. In access terminal management table 19 only information of accessing terminals is registered, and when it is decided that a terminal terminated access or moved by monitoring the access state, information of the terminal is deleted from access terminal management table 19.

FIG. 6 shows group management table 15. Group management table 15 includes group address information to which an attend request is issued and address information of terminal (distribution server) which sends data packet to the group address. Address information of sending terminal does not need to be set, and it is designated as needed by a combination of address of sending terminal and group when issuing group attend/withdrawal request. The address information is registered when multicast control processing part 16 receives a group attend request notice from access control processing part 17 and mobile terminal processing part 20, and is deleted when it receives a group withdrawal request notice.

Figures 7, 8:
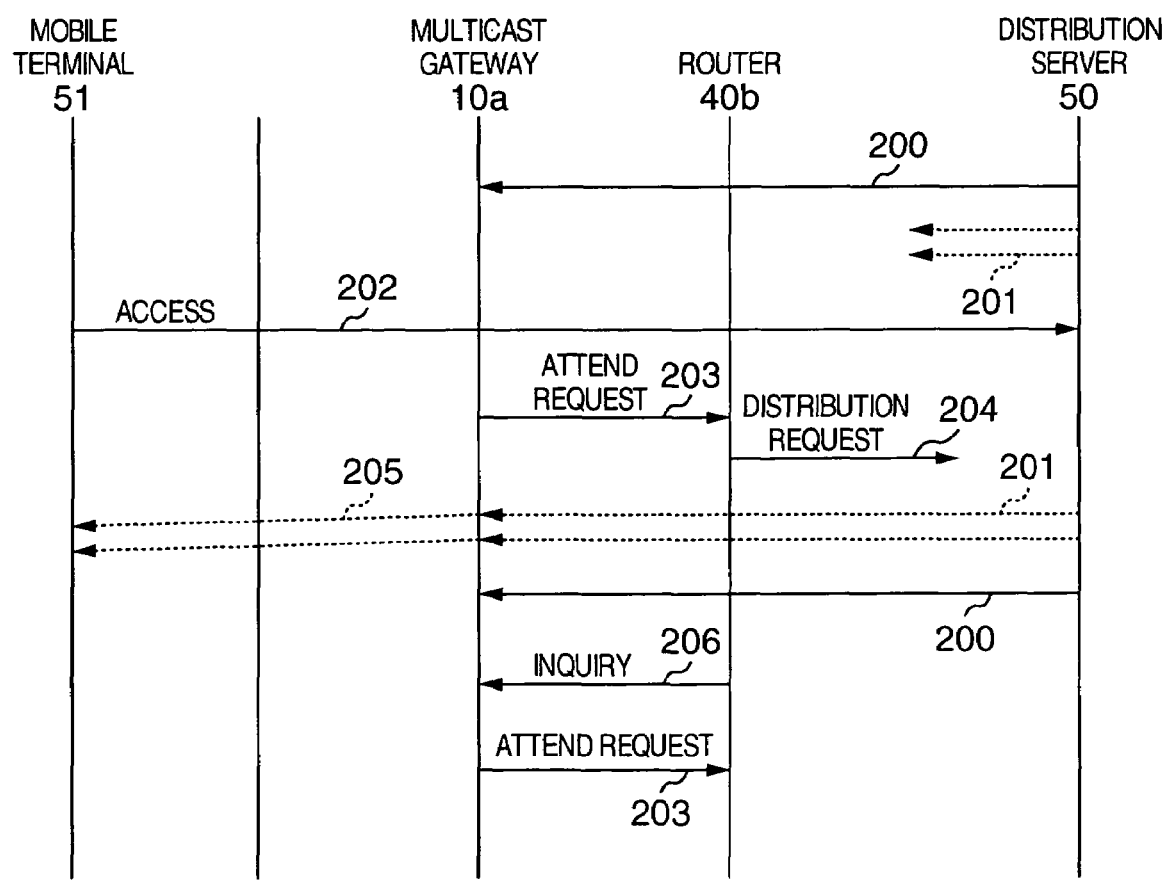
FIG. 7 shows an example of a mobile terminal management table.
FIG. 8 shows an example of a message sequence when a mobile terminal accesses a distribution server.

FIG. 7 shows mobile terminal management table 21. In mobile terminal management table 21 information included in a control packet of mobile IP is registered as mobile information other than home address and care-of address of moving terminals. In mobile information, information of encapsulation method, effective time of address information of mobile terminal, etc. are registered. Also, address information of multicast gateway apparatus to which access state information is to be sent is registered.

FIG. 8 shows a message sequence when mobile terminal 51 receives a data packet from distribution server 50 in the configuration of FIG. 1. It is assumed that distribution server 50 periodically posts service information 200 to multicast gateway apparatuses 10a and 10b, and distributes data packet 201 addressed to group G1 by multicast. It is assumed that in multicast gateway apparatus 10a the contents showed in FIG. 3 is registered in service information management table 18. Mobile terminal 51 issues access request 202 using TCP with port number 80 to distribution server 50 (address S1). Multicast gateway apparatus 10a checks the contents of the access request 202, and issues group attend request 203 to multicast group G1 for the corresponding service. Multicast router 40b receives group attend request 203 and sends distribution request 204 requesting distribution of data packet addressed to group G1. On receiving data packet 201 distributed to group G1, multicast gateway apparatus 10a sends data packet 205 with destination address of the data packet 201 changed to address H1 of mobile terminal 51 to mobile terminal 51. Multicast router 40b periodically sends group inquiry packet 206 to check whether there are terminals attending the multicast group. On receiving the group inquiry request 206, multicast gateway apparatus 10a responses with group attend request 203 about group G1 registered in group management table 15.

Figure 9:
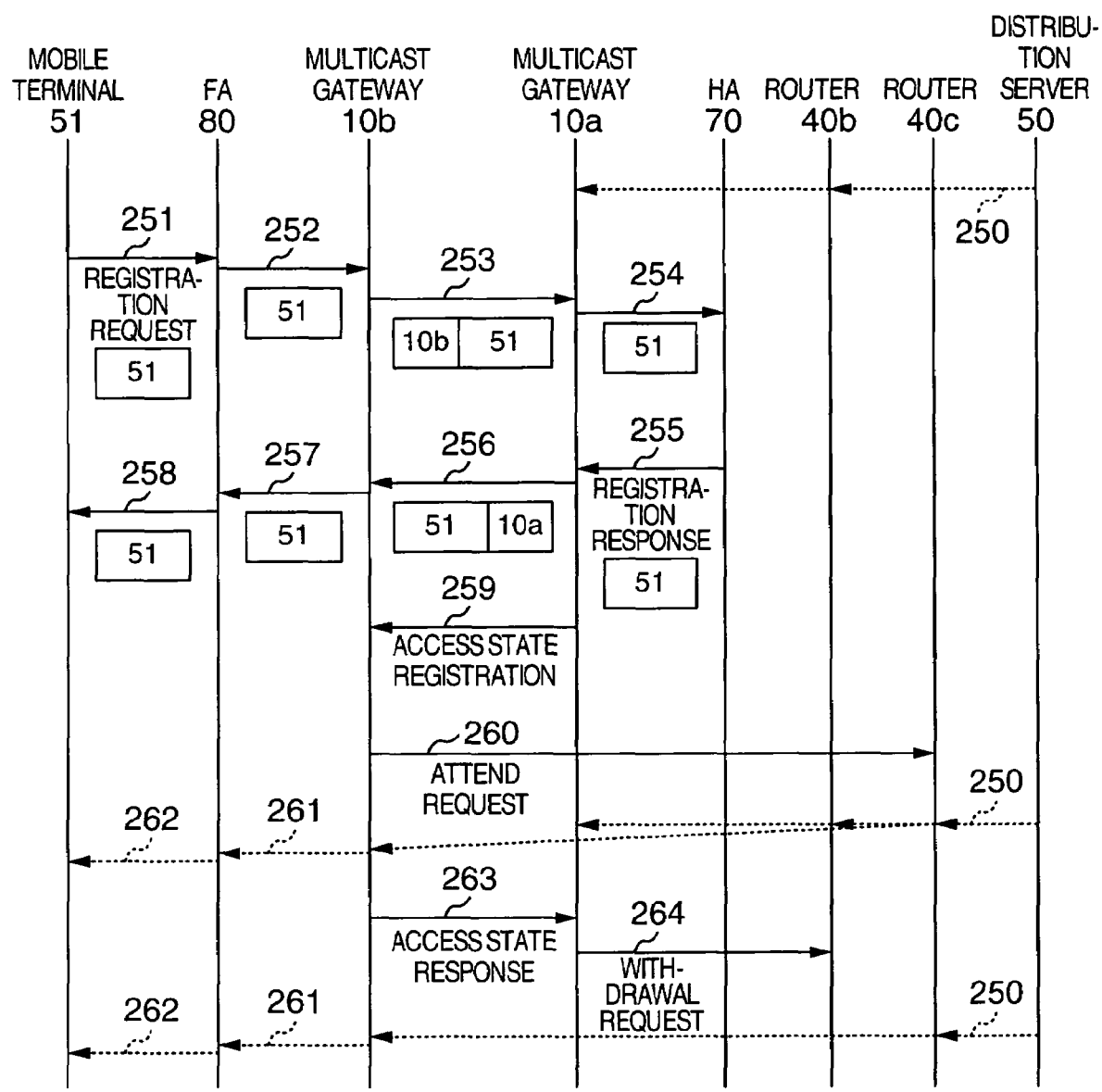
FIG. 9 shows an example of a message sequence when a mobile terminal moves to another network.

FIG. 9 shows a message sequence when mobile terminal 51 moves from network 61a to network 61b in the configuration of FIG. 1. It is assumed that multicast gateway apparatus 10a transfers data packet 250 addressed to multicast group G1 which distribution server 50 distributes to mobile terminal 51. When mobile terminal 51 moves to network 61b, it sends registration request message 251 of mobile IP to FA 80 of network 61b. FA 80 transfers registration request message 252 to HA 70. Multicast gateway apparatus 10b registers information of mobile terminal 51 included in received registration request message 252 in mobile terminal management table, adds its own address information and sends registration request message 253 to HA 70. Multicast gateway apparatus 10a registers information of mobile terminal 51 and information of multicast gateway apparatus 10b included in received registration request message 253 in the mobile terminal management table, and transfers registration request message 254 with information of multicast gateway apparatus 10b deleted to HA 70. HA 70 receives registration request message 254 and sends registration response message 255 to FA 80 after performing registration process of mobile terminal 51. Multicast gateway apparatus 10a adds its own information to received registration response message 255 and transfers registration response message 256 to FA 80. Multicast gateway apparatus 10b registers information of multicast gateway apparatus 10a included in received registration response message 256 in mobile terminal management table, and transfers registration response message 257 with address information of multicast gateway apparatus 10a deleted to FA 80. FA transfers registration response message 258 to mobile terminal 51. On the other hand, multicast gateway apparatus 10a sends access state registration packet 259 regarding mobile terminal 51 to multicast gateway apparatus 10b. On receiving the access state registration packet 259, multicast gateway apparatus 10b issues group attend request 260 to group G1 which mobile terminal 51 is receiving. Multicast router 40c receives group attend request 260 and relays multicast data packet 250 to multicast gateway apparatus 10b. On receiving multicast data packet 250, multicast gateway apparatus 10b transfers data packet 261 encapsulated with care-of address. Multicast gateway apparatus 10b sends access state response packet 263 to multicast gateway apparatus 10a. Multicast gateway apparatus 10a receives the access state response packet 263 and sends group withdrawal request 264 from group G1 to multicast router 40b if it finds that there is no need to transfer packet addressed to group G1. Multicast router 40b receives group withdrawal request 264 and stops relaying data packet to multicast gateway apparatus 10a.

Figure 10:
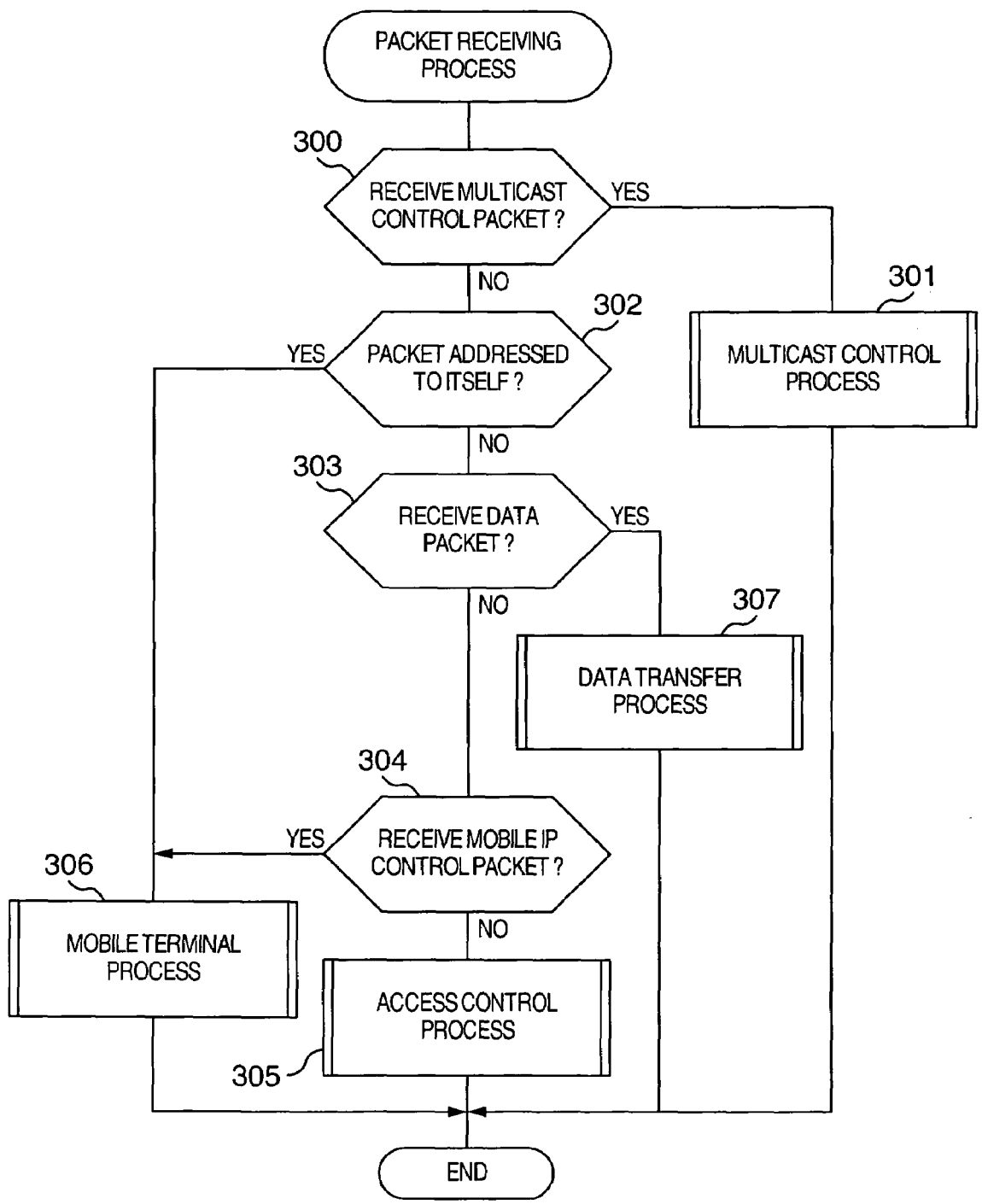
FIG. 10 is a flowchart showing a packet receiving process.

FIG. 10 shows a process flow of when receiving packet. The process discriminates which of these packets, a data packet multicast distributed from server, an access request packet from mobile terminal to server, a multicast control packet, a control packet of mobile IP and an information packet of access state the received packet is. When posting service information from distribution server, it also discriminates whether it is a packet including service information or not. Multicast control packet is a packet related to the multicast relaying control sent from the nearest multicast router. At step 300, when it received a multicast control packet, it performs multicast control process 301. When the packet is not a multicast control packet, the process decides whether it is a packet sent to itself or not at step 302. If it is a packet addressed to itself, as it is an information packet of access state from another multicast gateway apparatus, the process performs mobile terminal process 306. If it is not a packet addressed to itself, the process decides whether it is a data packet or not at step 303. This can be decided by whether destination address of received packet is registered in the service information management table or not. If it is decided to be a data packet, the process performs data transfer process 307. If it is not a data packet, the process decides whether it is a control packet of mobile IP or not at step 304. If it is a mobile IP control packet, the process performs mobile terminal process 306. Whether it is a mobile IP control packet or not can be decided by port number information. If the packet is neither of them, the process performs access control process 305.

Figure 11:
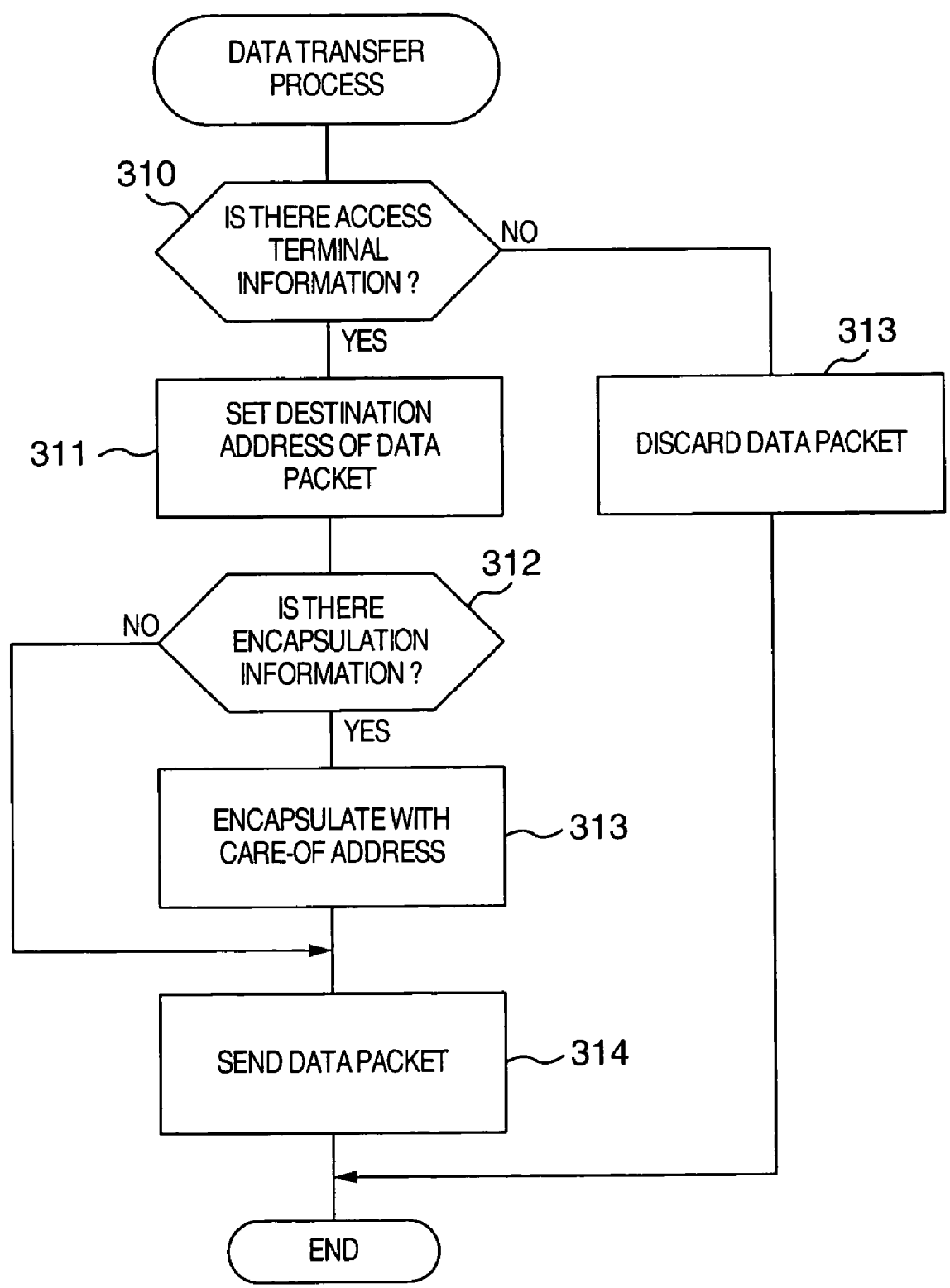
FIG. 11 is a flowchart showing a data transfer process.

FIG. 11 shows a flow of data transfer process. The process checks the access terminal management table and the service information management table (step 310) to know whether there are terminals to receive the received data packet. If terminals are registered in the access terminal management table, it sets addresses of each terminal to the destination address (step 311), and if information of encapsulation is registered (step 312), it encapsulates the data packet with care-of address (step 313), and sends the encapsulated data packet (step 314). If information of encapsulation is not registered at step 312, it sends the data packet without encapsulation. If a plurality of terminals are registered for one group, it transfers the received data packet to all of the terminals. If there is no terminal registered, the process discards the data packet (step 313).

Figure 12:
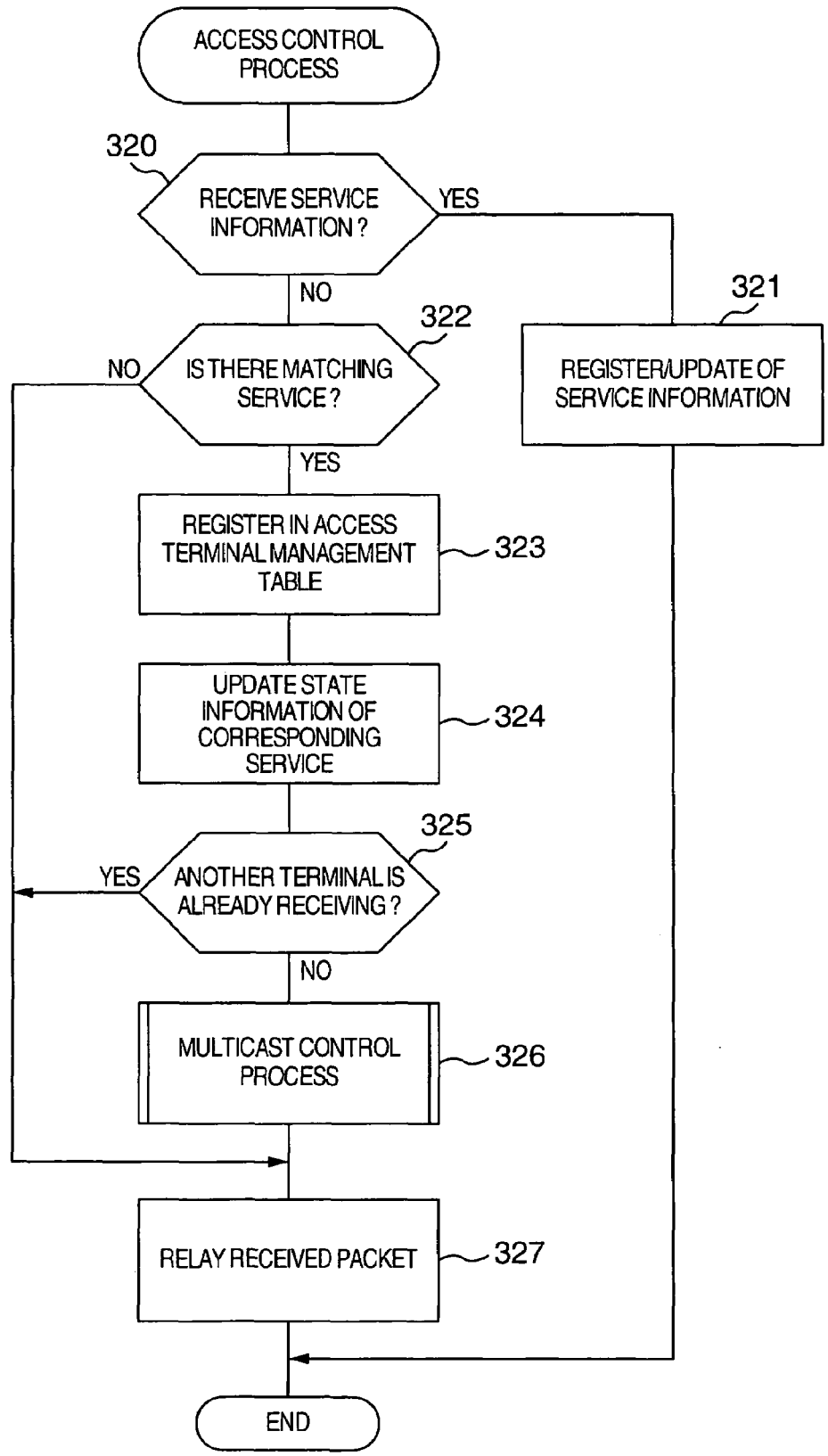
FIG. 12 is a flowchart showing an access control process.

FIG. 12 shows a process flow of access control process. The process flow shown here includes the case where service information is sent from distribution server. First, the process decides whether received packet is a packet including service information or a packet of access request from a terminal (step 320). In this decision the process checks destination address, protocol, port number of received packet. If it is a packet including service information, the process registers the service information in service information management table, or updates service information already registered (step 321). If received packet is a packet of access request packet, the process extracts destination address, protocol, port number and URL information of access destination from the received packet, and checks if there is information which matches in the service information management table (step 322). If there is no service information which matches, the process relays the packet as it is. If there is service information which matches, the process registers information of receiving terminal which sent the access request packet in the access terminal management table (step 323). At this point, if the terminal information has already been registered and service information which the terminal is accessing is different, the process changes it to the newly accessed service information. Next, the process updates accessing terminal number information as state information of service registered in the service information management table (step 324). When the receiving terminal changed access destination, the process decreases terminal number of currently accessing service information and increases terminal number information of newly accessed service information. At step 325 if there is service with the terminal number changed from 0 to 1 or from 1 to 0 by the update of terminal number information, multicast control process 326 is performed. Otherwise, the process decides that there has already been receiving terminal and step 327 is performed. As an access request packet is a packet addressed to distribution server, finally at step 327 the process relays the received packet toward distribution server.

Figure 13:
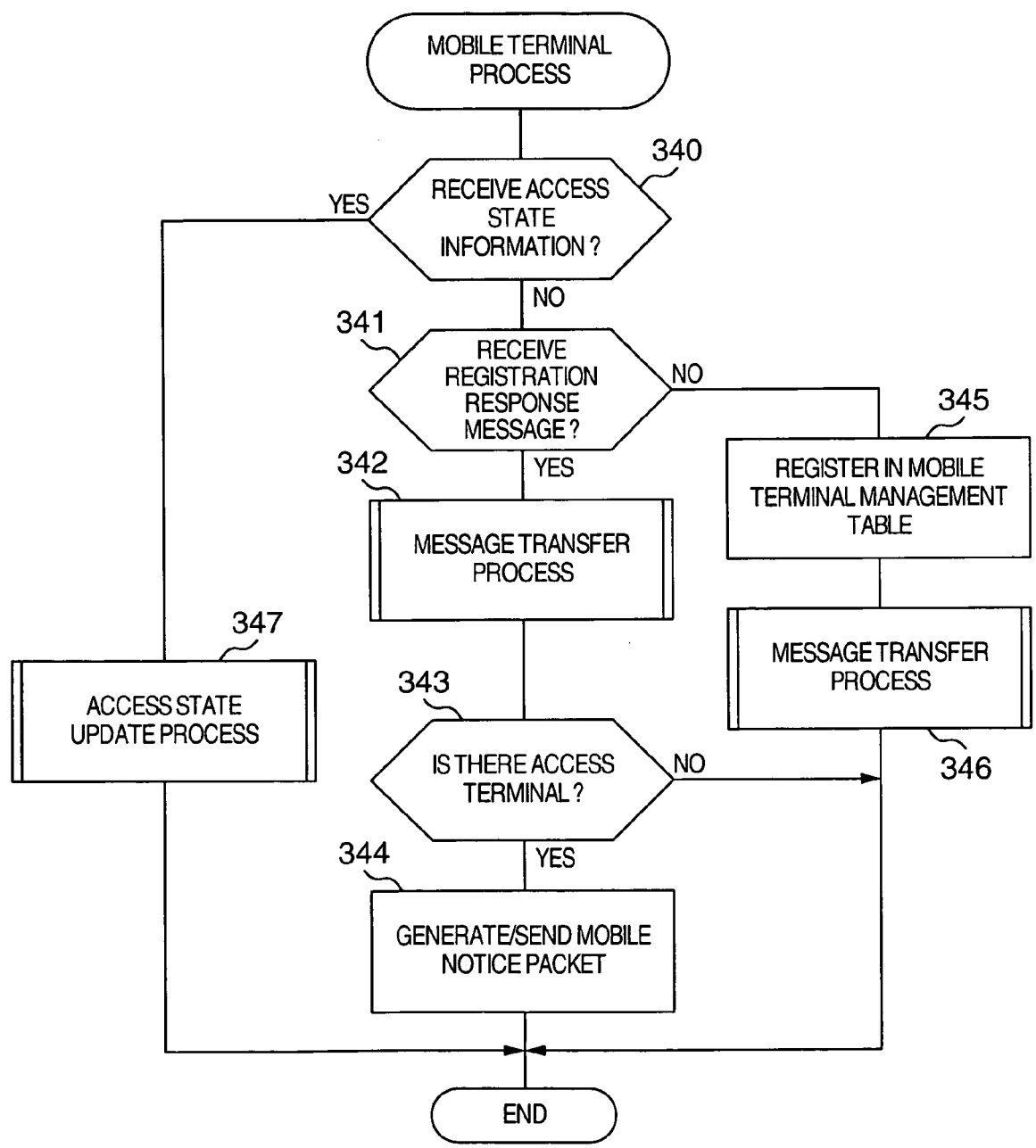
FIG. 13 is a flowchart showing a mobile terminal process.

FIG. 13 shows a process flow of mobile terminal process. The process decides whether received packet is an information packet of access state from multicast gateway apparatus or not (step 340), and if it is an information packet of access state, access state update process 347 is performed. At step 340, if it is a control packet of mobile IP, the process decides whether it is a registration response message or not (step 341). If it is a registration request message, the process registers information of mobile terminal included in the message in mobile terminal management table (step 345), performs message transfer process 346, and terminates the process. If it is a registration response message at step 341, message transfer process is performed (step 342). At step 343 if mobile terminal included in the message is registered in access terminal management table, the process generates an access state registration packet including information of the mobile terminal and accessing service information, and sends it to multicast gateway apparatus (step 344). At step 343, if information of the mobile terminal is not registered the process terminates.

Figure 14:
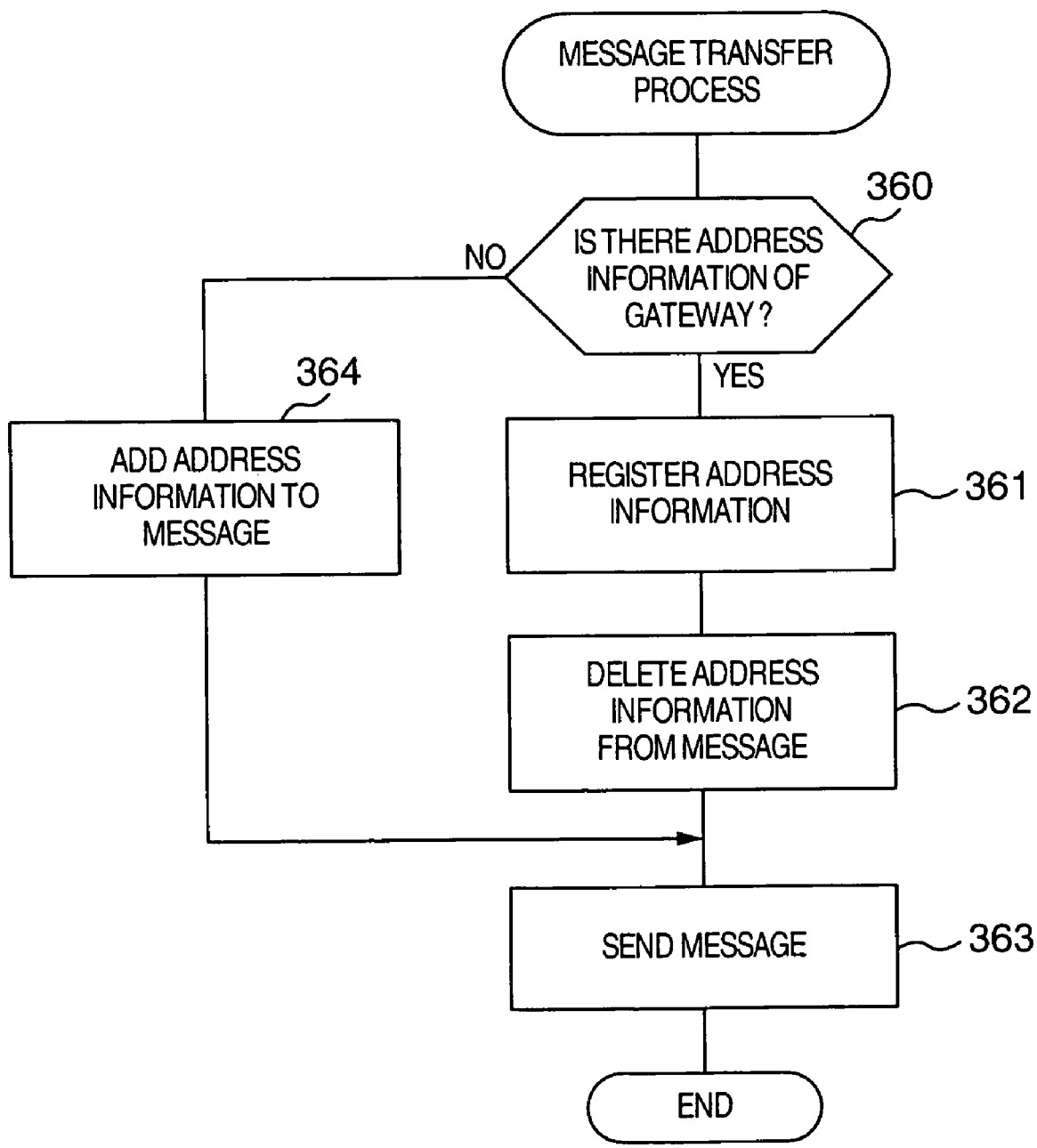
FIG. 14 is a flowchart showing a message transfer process.

FIG. 14 shows a process flow of message transfer process. The process decides whether address information of multicast gateway apparatus is included in received registration request message or registration response message of mobile IP (step 360). If there has already been included address information of multicast gateway apparatus, the process registers the address information in mobile terminal table (step 361), subsequently deletes address information of multicast gateway apparatus from the registration request or registration response message (step 362), and sends the message (step 363). If information of multicast gateway apparatus is not included, the process adds its own address information to the message (step 364) and sends the message (step 363).

Figure 15:
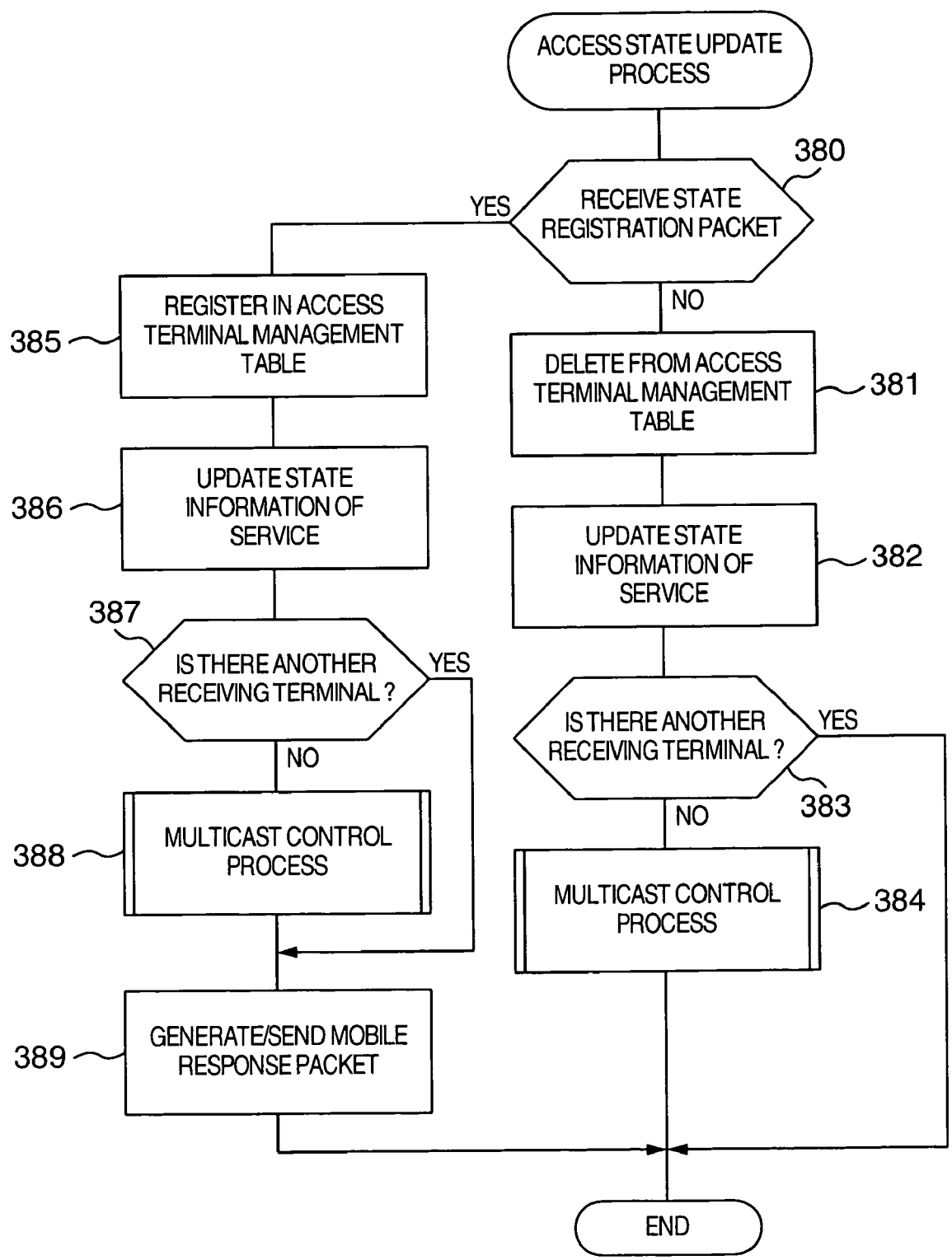
FIG. 15 is a flowchart showing an access information update process.

FIG. 15 shows a process flow of access state update process. When the process received an access state registration packet (step 380) it registers mobile terminal included in the packet in access terminal management table (step 385), and updates access terminal number information in service information management table (step 386). At step 387 if there is no terminal already receiving the service, multicast control process 388 is performed and the process generates and sends an access state response packet (step 389). At step 380 when the process received an access state response packet, it deletes mobile terminal included in the packet from the access terminal management table (step 381) and updates access terminal number information in the service information management table (step 382). At step 383 if there is no terminal receiving the service, multicast control process 384 is performed, and if there are other terminals still receiving, the process terminates.

Figure 16:
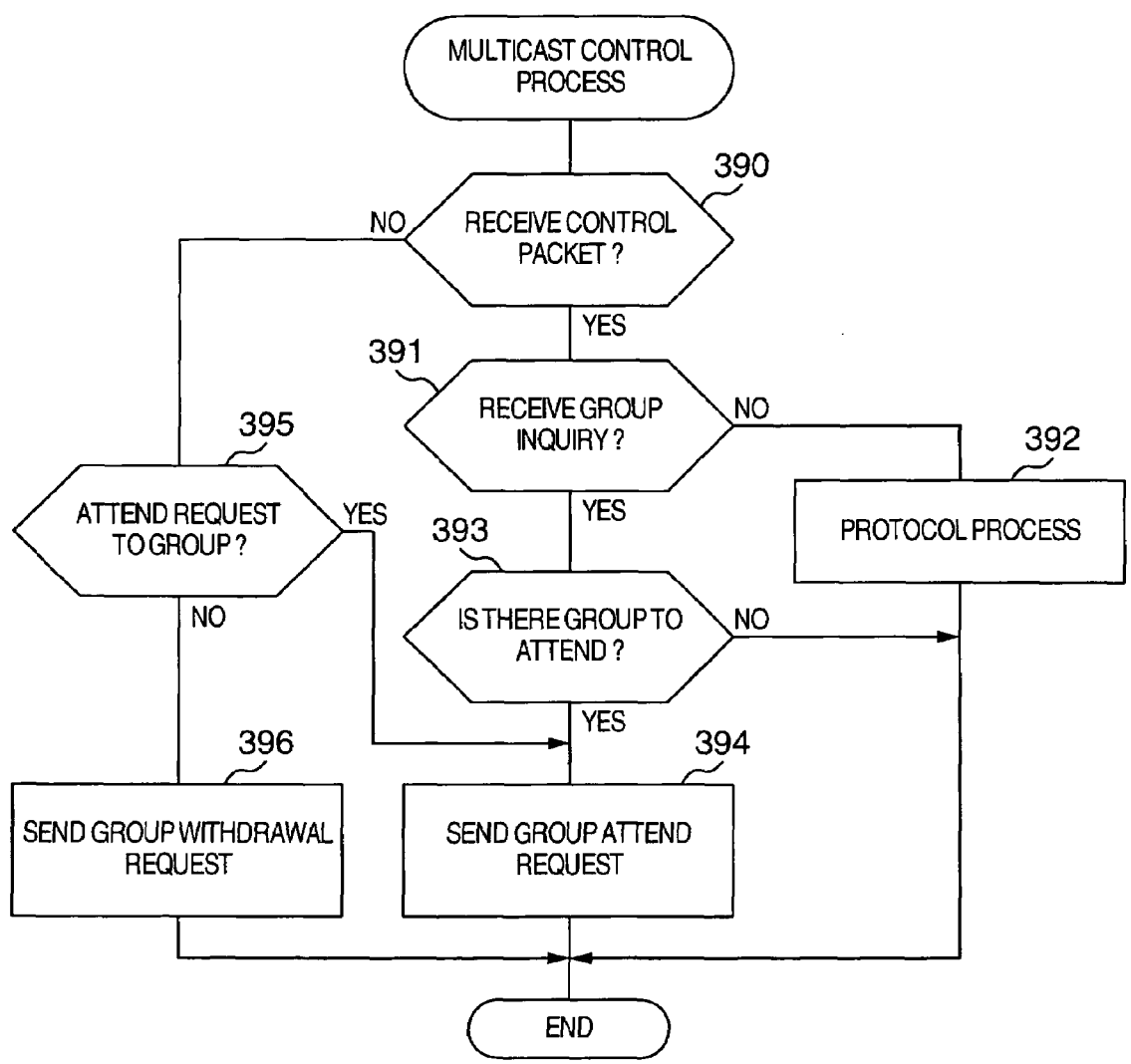
FIG. 16 is a flowchart showing a multicast control process.

FIG. 16 shows a process flow of multicast control process. At step 390, the process checks if it is receiving a control packet related to multicast control. If it is not receiving a control packet, as it is a request from access control process 305 or access state update process 347 it checks the request contents at step 395. At step 395, if it is the contents indicating attendance to group, the process registers group information and distribution server address information in the group member management table and issues a group attend request for the multicast group (step 394). If the contents indicate withdrawal from group, the process deletes the group information from the group member management table and issues a group withdrawal request (step 396). At step 390 if it is receiving a control packet, it checks whether it is a group attend inquiry packet or not (step 391). If it is not a group attend inquiry packet, the process according to the received protocol is performed (step 392). If it is a group attend inquiry packet, the process retrieves the group member management table to check if there is any registered group or not (step 393), and issues group attend requests about all the group registered (step 394).

Embodiment 2

It will be described about the case where multicast gateway apparatus mentioned in the first embodiment is provided with the conventional mobile IP function and operates as HA or FA as the second embodiment of the present invention.

Figure 17:
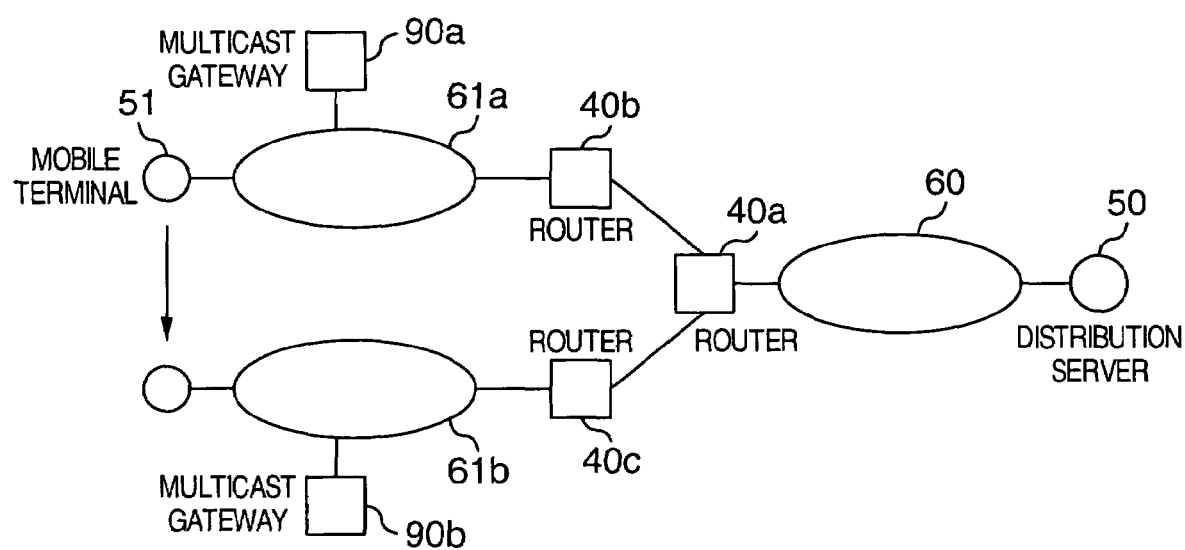
FIG. 17 is a configuration diagram of a network system to which an agent apparatus of mobile communication protocol according to the second embodiment is applied.

FIG. 17 shows an example of system configuration to which the present invention according to this embodiment is applied. Multicast gateway apparatuses 90a, 90b are connected to networks 61a, 61b respectively, in network 61a multicast gateway apparatus 90a operates also as HA, in network 61b multicast gateway apparatus 90b operates also as FA. Distribution server 50 is connected to network 60 and mobile terminal 51 is connected to network 61a. Networks 60, 61 and 61b are interconnected by multicast routers 40a, 40b and 40c.

Figure 18:
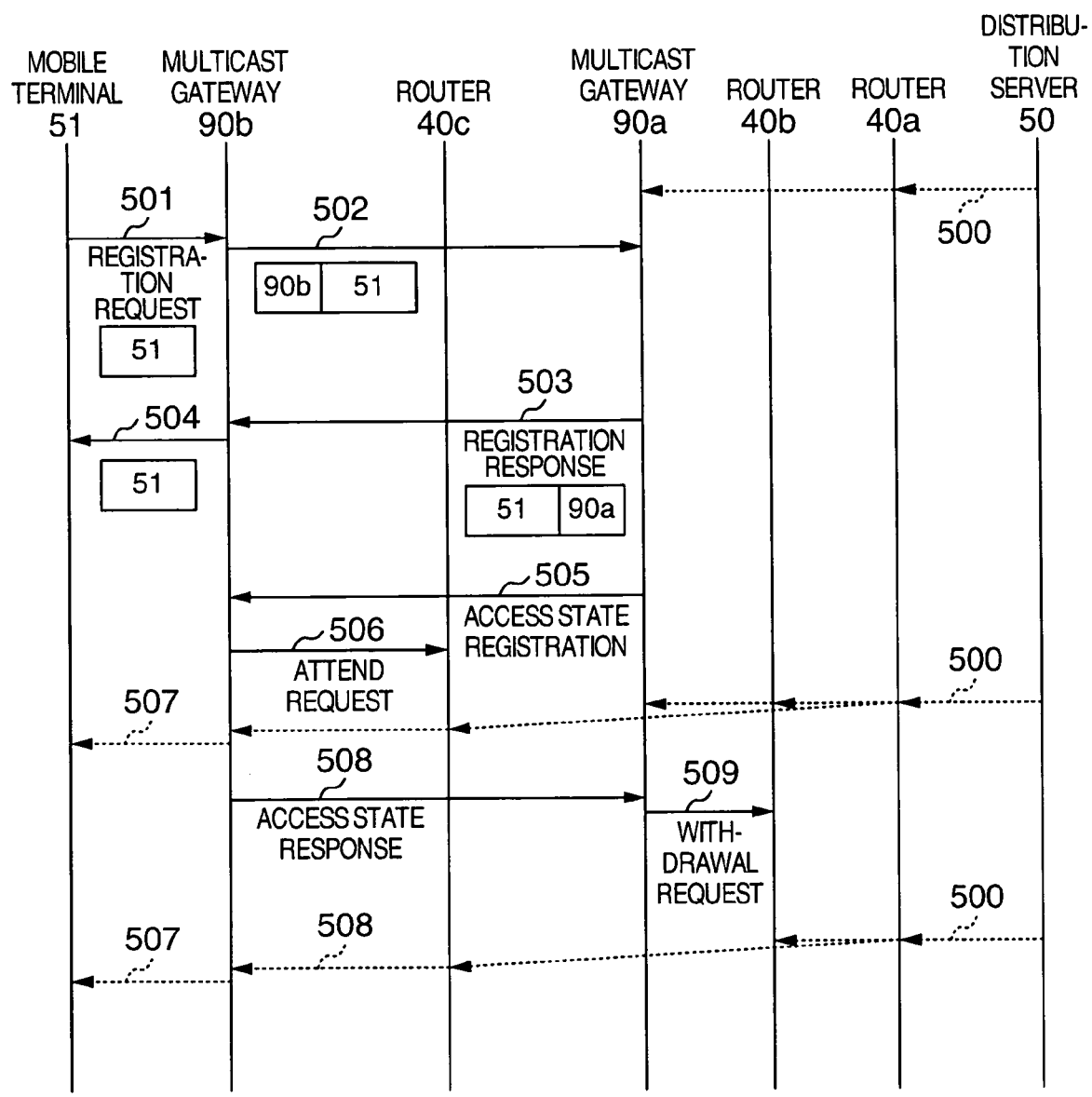
FIG. 18 shows an example of a message sequence in the second embodiment.

FIG. 18 shows a message sequence in case where mobile terminal 51 moves to network 61b in situation in which it is receiving data packet 500 from distribution server 50 on network 61a in the configuration of FIG. 17. When mobile terminal 51 moved to network 61b, it sends registration request message 501 to multicast gateway apparatus 90b. On receiving registration request message 501, multicast gateway apparatus 90b performs the conventional process of mobile IP and registers information of mobile terminal included in registration request message 501 in mobile terminal management table. Next, it transfers registration request message 502 added with its own address information to multicast gateway apparatus 90a. Multicast gateway apparatus 90a registers information of mobile terminal and address information of multicast gateway apparatus 90b included in received registration request message 502 in mobile terminal management table. Next, after performing the conventional process of mobile IP, it sends registration response message 503 added with its own information to multicast gateway apparatus 90b. As mobile terminal 51 is receiving data packet from distribution server 50, multicast gateway apparatus 90a sends access state registration packet 505 including information of mobile terminal 51 and receiving service information to multicast gateway apparatus 90b. On receiving registration response message 503, multicast gateway apparatus 90b registers address information of multicast gateway apparatus 90a and deletes information of multicast gateway apparatus 90a from registration response message 503. Further, it performs the conventional process of mobile IP and transfers registration response message 504 to mobile terminal 51. On receiving access state registration packet 505, multicast gateway apparatus 90b issues group attend request 506 for multicast group related to service included in the packet to multicast router 40c. Also, it sends access state response packet 508 including information of mobile terminal 51 and service information to multicast gateway apparatus 90a. On receiving group attend request 506, multicast router 40c performs multicast path control and relays multicast data packet 500 from distribution server 50 to multicast gateway apparatus 90b. On receiving the multicast data packet, multicast gateway apparatus 90b transfers it to mobile terminal 51. On receiving access state response packet 508, multicast gateway apparatus 90a deletes information of mobile terminal 51 from access terminal management table and sends withdrawal request 509 from multicast group related to the receiving service to multicast router 40b. Multicast router 40b stops relaying data packet to multicast gateway apparatus 90a by multicast path control process.

Figure 19:
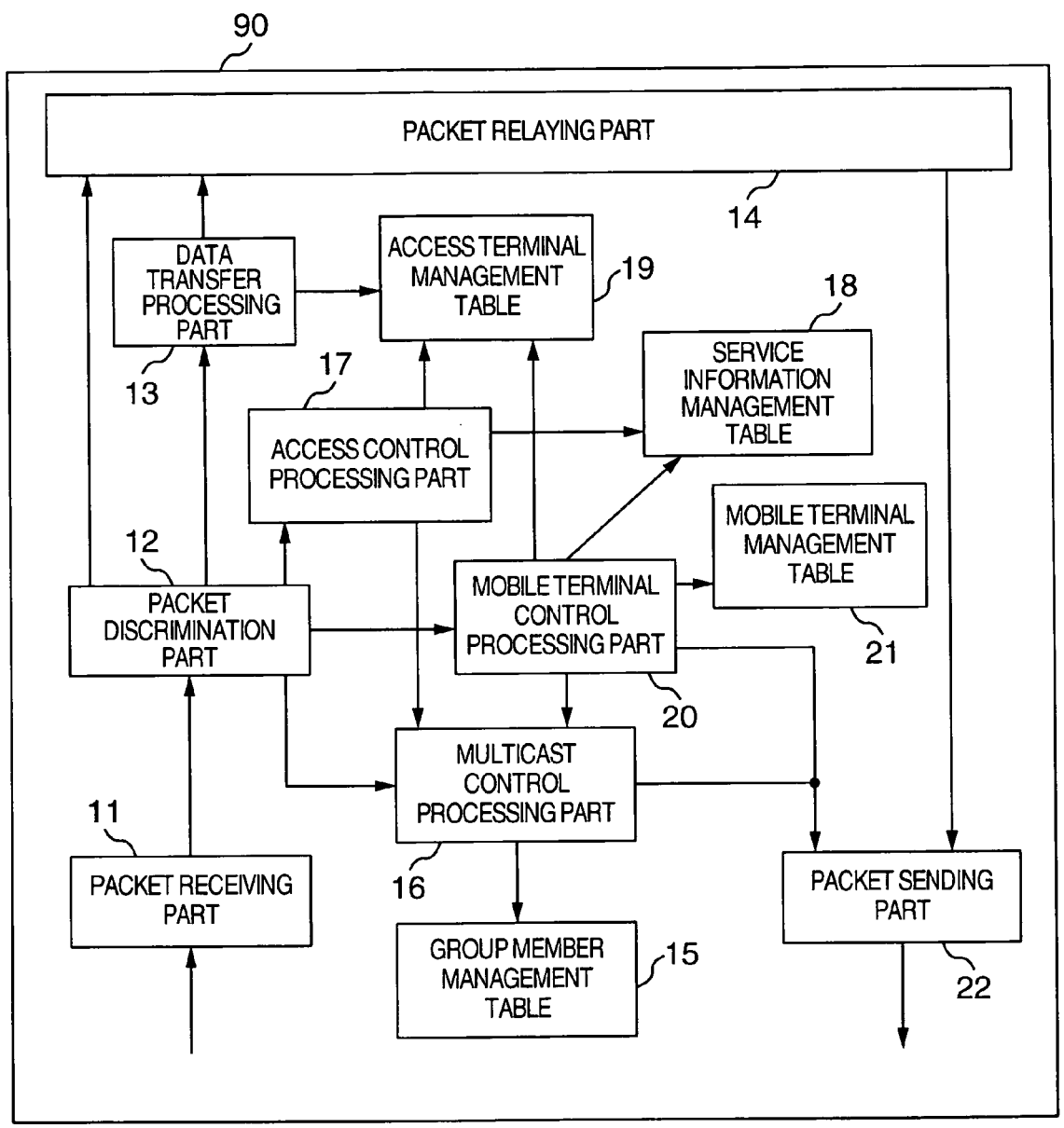
FIG. 19 is a block diagram of an agent apparatus according to the second embodiment.

FIG. 19 is a block diagram of multicast gateway apparatus 90 according to the second embodiment. Packet receiving part 11, packet relaying part 14, data transfer processing part 13, multicast control processing part 16, access control processing part 17, and packet sending part 22 perform the same process as in the first embodiment. Group member management table 15, service information management table 18, access terminal management table 19, and mobile terminal management table 21 include the same information as in the first embodiment. Packet discrimination part 12, in discrimination of data packet, decides whether to transfer multicast data packet to mobile terminal or to transfer data packet addressed to mobile terminal to mobile terminal connected to a foreign network as a function of HA or FA. This decision is decided by the destination address of received data packet. If the destination address is a multicast address and is registered in the service information management table, the process proceeds to data transfer process 13. If the destination address matches either of home address which is managed as mobile IP information or care-of address, the process proceeds to mobile terminal processing part 20. Mobile terminal processing part 20, in addition to the process of the first embodiment, performs management of mobile IP information, sending agent advertisement message, encapsulation transfer process and decapsulation transfer process of data packet to mobile terminal which moved to foreign network.

According to this embodiment, it is possible to reduce the management burden of the network administrator and the cost of communication apparatuses by reducing the number of apparatuses located on network.

Embodiment 3

Next, it will be described about a multicast gateway apparatus 100 provided with a multicast path control function as the third embodiment of the present invention.

Figure 20:
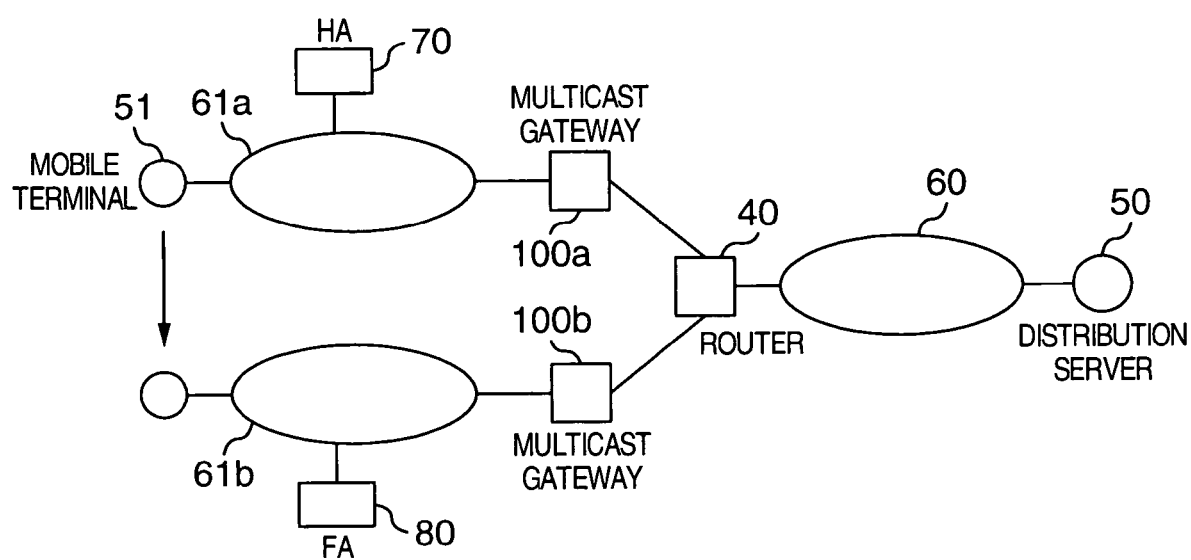
FIG. 20 is a configuration diagram of a network system to which a router apparatus according to the third embodiment is applied.

FIG. 20 shows an example of system configuration according to this embodiment. Multicast gateway apparatus 100a is connected to network 61a, multicast gateway apparatus 100b is connected to network 61b, and each multicast gateway apparatus is connected to router 40. To network 61a HA 70 is connected and to network 61b FA 80 is connected. Distribution server 50 is connected to network 60, and to multicast network 61a mobile terminal 51 is connected.

Figure 21:
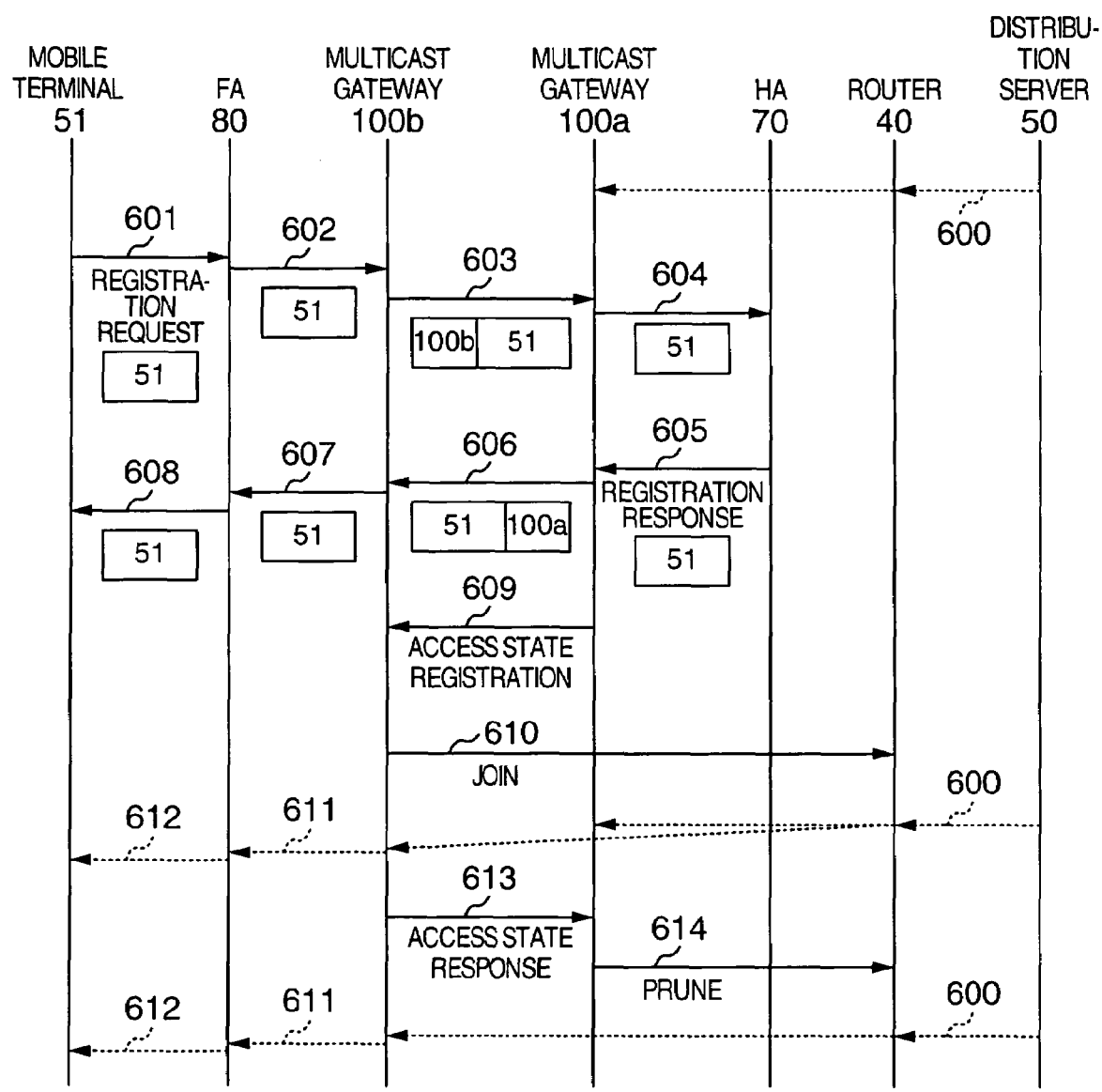
FIG. 21 shows an example of a message sequence in the third embodiment.

FIG. 21 shows a message sequence in case where the mobile terminal moved to network 61b in situation in which it is receiving data packet 600 from distribution server 50 on network 61a in the configuration of FIG. 19. It is assumed that multicast gateway apparatus 100 uses PIM-SM as a multicast path control protocol. When mobile terminal 51 moved to network 61b, it sends registration request message 601 to FA 80 of network 61b. FA 80 transfers registration request message 602 to HA. Multicast gateway apparatus 100b registers information of mobile terminal 51 included in received registration request message 602 in the mobile terminal management table and transfers registration request message 603 added with its own address information to HA 70. Multicast distribution apparatus 100a registers information of mobile terminal 51 and address information of multicast gateway apparatus 100b included in received registration request message 603 in the mobile terminal management table, deletes information of multicast gateway apparatus 100b from registration request message 603 and transfers registration request message 604 to HA 70. On receiving registration request message 604, HA 70 performs the registration process of mobile terminal 51 and sends registration response message 605 to mobile terminal 51 or FA 80. On receiving registration response message 605, multicast gateway apparatus 100a transfers registration response message 606 added with its own address information to FA 80. If information of mobile terminal included in received registration response message 606 is registered in the mobile terminal management table, multicast gateway apparatus 100b registers information of multicast gateway apparatus 100a in the mobile terminal management table, deletes information of multicast gateway apparatus 100a and transfers registration response message 607 to FA 80. When multicast gateway apparatus 100a finds that mobile terminal registered in the mobile terminal management table is registered in the access terminal management table, it sends access state registration packet 609 including information of the mobile terminal and information regarding receiving service to multicast gateway apparatus 100b. On receiving the access state registration packet 609, multicast gateway apparatus 100b sends JOIN packet 610 indicating a distribution request of data packet in PIM-SM for multicast group corresponding to the service to router 40. On receiving JOIN 610, multicast router 40 performs multicast path control and relays data packet to multicast gateway apparatus 100b. On receiving data packet 600, multicast gateway apparatus 100b transfers data packet 611 encapsulated with care-of address. Multicast gateway apparatus 100b sends access state response packet 613 to multicast gateway apparatus 100a. Multicast gateway apparatus 100a receives access state response packet 613 and when it finds that there is no need to transfer packet addressed to multicast group, sends PRUNE packet 614 indicating a distribution stop request of data packet in PIM-SM to multicast router 40. On receiving PRUNE packet 614, router 40 performs the multicast path control process and stops relaying data packet 600 to multicast gateway apparatus 100a.

Figure 22:
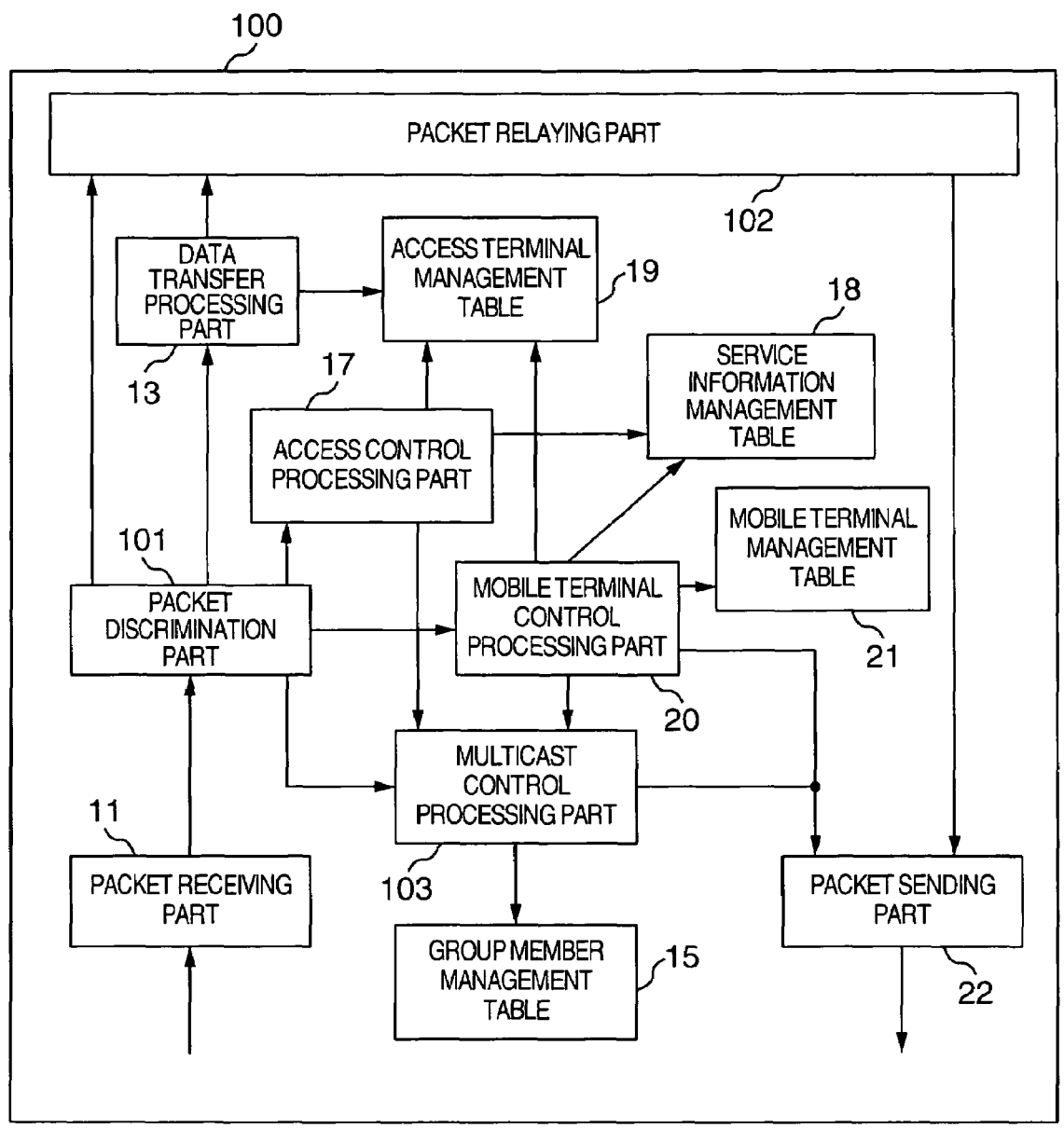
FIG. 22 is a block diagram of a router apparatus according to the third embodiment.

FIG. 22 is a block diagram of multicast gateway apparatus 100 according to this embodiment. Packet receiving part 11, data transfer processing part 13, access control part 17, mobile terminal processing part 20, and packet sending part 22 perform the same process as in the first embodiment. Group management table 15, service information management table 18, and access terminal management table 19 include the same information as in the first embodiment. At packet discrimination part 101, when received packet is a data packet distributed by multicast it delivers received data packet to data transfer processing part 13 and packet relaying part 102. As multicast gateway apparatus 100 is provided with a multicast relaying function, at packet relaying part 102 there are cases where it relays data packet by multicast as needed. At data transfer processing part 13, it obtains information of terminal to which the data packet is to be transferred from access terminal management table 19, sets address of each terminal to the destination address information of the data packet and delivers it to packet relaying part 102. When access from terminal is detected at access control processing part 17 or when it is detected that accessing mobile terminal has moved to another network at mobile terminal processing part 20, it registers the terminal information in access terminal management table 19 and posts group information and address information of distribution server to multicast control processing part 103. At multicast control processing part 103, it sends a distribution request of data packet addressed to the multicast group using the multicast path control protocol.

According to this embodiment, it is possible to reduce the management burden of the network administrator and the cost of communication apparatuses by reducing the number of apparatuses located on network.

Embodiment 4

Next, as the fourth embodiment of the present invention, it will be described about multicast gateway apparatus 120 in a network to which IP version 6 (hereinafter it is referred to as IPv6) is applied. In mobile IP corresponding to IPv6 (herein after it is referred to as mobile IPv6) mobile terminal sends a binding update message as a message corresponding to the registration request message of mobile IP and a binding acknowledge message as a message corresponding to the registration response message. Moreover, in mobile IPv6 FA is not needed and the binding update message and binding acknowledge message are sent and received between mobile terminal and HA.

Figure 23:
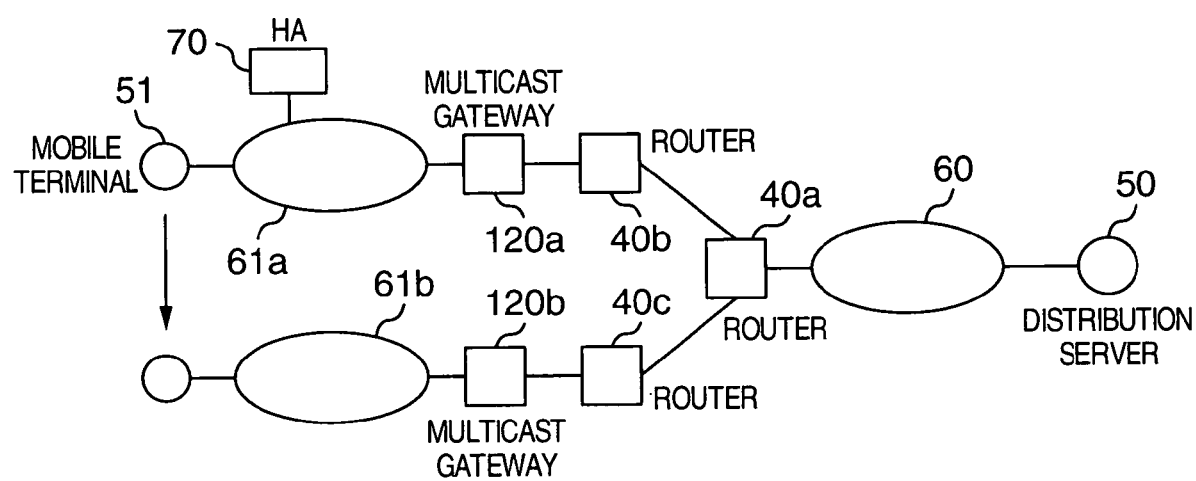
FIG. 23 is a configuration diagram of a network system to which a multicast gateway apparatus according to the fourth embodiment is applied.

In FIG. 23 when mobile terminal 51 moves from network 61a which is a home network of mobile terminal 51 to network 61b, it sends a binding update message of mobile IPv6 to HA 70 of network 61a. In binding update message care-of address is used as source address and home address is included in binding update message. On receiving the binding update message, multicast gateway apparatus 120b registers source address of the binding update message and home address of mobile terminal 51 included in the message in the mobile terminal management table which is retained within multicast gateway apparatus 120. Further, multicast gateway apparatus 120b newly adds its own address information to the binding update message and transfers it to HA 70. Multicast gateway apparatus 120a registers the home address and care-of address information of mobile terminal 51 and address information of multicast gateway apparatus 120b included in received binding update message in the mobile terminal management table which is retained within multicast gateway apparatus 120a. Further, multicast gateway apparatus 120a deletes address information of multicast gateway apparatus 120b from the binding update message and transfers it to HA 70. HA 70 receives binding update message and sends binding acknowledge message to mobile terminal 51 after performing the registration process of mobile terminal 51. In binding acknowledge message care-of address is used as destination address and home address is included in binding acknowledge message. Multicast gateway apparatus 120a adds its own address information to the binding acknowledge message and sends it to mobile terminal. Further, multicast gateway apparatus 120a sends an access state registration packet including address information of mobile terminal 51 and receiving service information to multicast gateway apparatus 120b if home address information of mobile terminal 51 is registered in the access terminal management table. Multicast gateway apparatus 120b, if destination address of the received binding acknowledge message and home address information of mobile terminal 51 included in the acknowledge message are registered in the mobile terminal management table, registers address information of multicast gateway apparatus 120a included in the binding acknowledge message in the mobile terminal management table and deletes address information of multicast gateway apparatus 120a from the binding acknowledge message and transfers the binding acknowledge message to mobile terminal 51.

On receiving access state registration packet from multicast gateway apparatus 120a, multicast gateway apparatus 120b issues an attend request for multicast group G related to service information included in the packet to multicast router 40c. Also, it registers home address information and care-of address information and the like of mobile terminal 51 in the access terminal management table, and sends an access state response packet indicating that access state has been registered to multicast gateway apparatus 120a. In this access state response packet, address information of mobile terminal 51 and receiving service information are included. Multicast router 40c receives the group attend request and relays multicast data to multicast gateway apparatus 120b. On receiving multicast data, multicast gateway apparatus 120b sets care-of address to destination address and transfers data with home address information included in a part of header information.

On receiving access state response packet from multicast gateway apparatus 120b, multicast gateway apparatus 120a deletes information of mobile terminal 51 from the access terminal management table. At this point, if it is found that there is no mobile terminal which accesses distribution server 50 at multicast gateway apparatus 120a, it issues a withdrawal request from group G to multicast router 40b. Responding to this multicast router 40b relays data packet addressed to group G only to multicast gateway apparatus 120b.

When information is distributed to a large number of terminals including mobile terminals such as mobile telephone, as the number of terminals to distribute increases traffic volume running on the network will increase. As in the multicast the router apparatus duplicates packet, traffic volume does not change regardless of the number of terminals to distribute. Therefore, by using the multicast it becomes possible to distribute information to more terminals without increasing the traffic volume. To provide a multicast distribution service to more users it is necessary to make the terminals and all the routers on the network adapted to the multicast, thus it would cost a lot.

According to the present invention, in the multicast distribution service, a data packet multicast distributed to the terminal which can not receive data packet distributed by multicast is transferred addressed to each receiving terminal. Also when the receiving terminal moves to another network, the data packet is transferred efficiently via the best suited communication path from the distribution server. The present invention is also effective when the mobile terminal is provided with a multicast function but a network which is not able to multicast communicate because a router is not provided with a multicast function or for other reasons exists on the communication path. Therefore, it is possible to provide the service to many users only by adapting a part without adapting the whole network to the multicast.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for distributing data multicast from a source and addressed to a receiving terminal which does not support a multicast function via a gateway, the multicast distribution method comprising the steps of:

detecting a data request packet, sent from the receiving terminal registered in a first network to the source, at a first gateway located on a transfer path of a packet between the receiving terminal and the source;

retaining an address of the receiving terminal included in the data request packet;

detecting a registration message which the receiving terminal issues to a second network;

sending a receive state information packet including information relating address information of the source and destination address information of data multicast to a second gateway located on a transfer path of a packet between the second network and the source;

sending from the second gateway a distribution request packet of multicast data, based on a received receive state information packet, to the source; and converting address information of a multicast data packet sent from the source to an address of the receiving terminal and sending the multicast data packet to the receiving terminal.

2. A service system which distributes information to a receiving terminal which is not provided with a receiving function of multicast data using multicast communication, comprising:

a distribution server which multicasts data packets including information to provide;

a home agent located in a home network to which the receiving terminal belongs;

a foreign agent located in a foreign network to which the receiving terminal can move;

a first multicast gateway apparatus located on a communication path between the home agent and the distribution server;

a second multicast gateway apparatus located on a communication path between the foreign agent and the distribution server;

wherein the first and the second multicast gateway apparatuses comprise a unit for converting a data packet that is multicast to unicast data, and the first multicast gateway apparatus, upon receiving a registration message which the receiving terminal issued for the foreign agent, transfers address information of the distribution server and home address information of the receiving terminal to the second gateway, the second gateway sends a distribution request packet of multicast data to the distribution server, and further converts multicast data sent from the distribution server to unicast data and sends the unicast data to the receiving terminal.

3. A method for providing service which distributes data multicast that is from a distribution server to a receiving terminal which is not provided with a receiving function of multicast data, comprising the steps of:

detecting a data request packet sent from a receiving terminal registered in a first network to the distribution server at a first gateway located on a transfer path of a packet between the receiving terminal and the distribution server;

retaining an address of the receiving terminal included in the data request packet;

detecting that the receiving terminal moved to a second network by a registration message which the receiving terminal issued to the second network;

sending address information of the distribution server and destination address information of data to be multicast to the second gateway located on a transfer path of a packet between the receiving terminal after moving to the second network and the distribution server;

sending a distribution request packet of multicast data to the distribution server from the second gateway;

converting destination address information of multicast data sent from the distribution server to an address of the receiving terminal; and sending multicast data with the destination address convened to the receiving terminal.

* * * * *